(12) United States Patent
Mannefred et al.

(10) Patent No.: US 10,310,510 B2
(45) Date of Patent: Jun. 4, 2019

(54) ROBOTIC VEHICLE GRASS STRUCTURE DETECTION

(71) Applicant: HUSQVARNA AB, Huskvarna (SE)

(72) Inventors: Björn Mannefred, Jönköping (SE); Stefan Grufman, Bankeryd (SE); Anders Mattsson, Ulricehamn (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/538,002

(22) PCT Filed: Oct. 20, 2015

(86) PCT No.: PCT/IB2015/058090
§ 371 (c)(1),
(2) Date: Jun. 20, 2017

(87) PCT Pub. No.: WO2016/103068
PCT Pub. Date: Jun. 30, 2016

(65) Prior Publication Data
US 2017/0344020 A1    Nov. 30, 2017

Related U.S. Application Data

(60) Provisional application No. 62/095,315, filed on Dec. 22, 2014, provisional application No. 62/097,312, filed on Dec. 29, 2014.

(51) Int. Cl.
*G05D 1/02* (2006.01)
*A01B 69/04* (2006.01)
(Continued)

(52) U.S. Cl.
CPC ......... *G05D 1/0246* (2013.01); *A01B 69/008* (2013.01); *A01D 34/008* (2013.01);
(Continued)

(58) Field of Classification Search
CPC ................ A01B 69/008; A01D 34/008; G06K 9/00791; G06K 9/4609
(Continued)

(56) References Cited

U.S. PATENT DOCUMENTS 9,603,300 B2 *   3/2017   Pettersson ............ A01D 34/008
2008/0219508 A1 *   9/2008   Ganguli ............... G05D 1/0246
382/104
(Continued)

FOREIGN PATENT DOCUMENTS

DE     10327223 A1     1/2005
EP     2286653 A2      2/2011
EP     2620050 A1      7/2013

OTHER PUBLICATIONS

International Search Report and Written Opinion for International Application No. PCT/IB2015/058090 dated Feb. 1, 2016, all enclosed pages cited.
(Continued)

*Primary Examiner* — Yazan A Soofi
(74) *Attorney, Agent, or Firm* — Burr Forman McNair

(57) ABSTRACT

A robotic vehicle may be configured to incorporate multiple sensors to make the robotic vehicle capable of detecting grass by measuring edge data and/or frequency data. In this regard, in some cases, the robotic vehicle may include an onboard positioning module, a detection module, and a mapping module that may work together to give the robotic vehicle a comprehensive understanding of its current location and of the features or objects located in its environment. Moreover, the robotic vehicle may include sensors that enable the modules to collect and process data that can be used to identify grass on a parcel on which the robotic vehicle operates.

20 Claims, 15 Drawing Sheets

(51) Int. Cl.
*A01D 34/00* (2006.01)
*G06K 9/00* (2006.01)
*G06K 9/46* (2006.01)

(52) U.S. Cl.
CPC ....... *G05D 1/0274* (2013.01); *G06K 9/00791* (2013.01); *G06K 9/4609* (2013.01); *G05D 2201/0208* (2013.01)

(58) Field of Classification Search
USPC .......................................................... 701/28
See application file for complete search history.

(56) References Cited

U.S. PATENT DOCUMENTS

| | | | | |
|---|---|---|---|---|
| 2013/0190965 A1* | 7/2013 | Einecke | ............... | A01D 34/008 701/28 |
| 2015/0375084 A1* | 12/2015 | Peterson | ................. | G01S 19/19 473/406 |
| 2016/0195876 A1* | 7/2016 | Mattsson | ............... | A01G 25/16 701/25 |
| 2017/0127607 A1* | 5/2017 | Mannefred | .......... | G05D 1/0044 |

OTHER PUBLICATIONS

International Preliminary Report on Patentability for International Application No. PCT/IB2015/058090 dated Jun. 27, 2017, all enclosed pages cited.

* cited by examiner

ROBOTIC VEHICLE GRASS STRUCTURE DETECTION

CROSS REFERENCE TO RELATED APPLICATIONS

The present application claims priority to U.S. patent application Nos. 62/095,315 filed Dec. 22, 2014, and 62/097,312 filed Dec. 29, 2014, both of which are expressly incorporated by reference in their entirety.

TECHNICAL FIELD

Example embodiments generally relate to robotic vehicles and, more particularly, relate to a robotic vehicle that is configurable to detect the presence of grass by measuring various aspects of objects.

BACKGROUND

Yard maintenance tasks are commonly performed using various tools and/or machines that are configured for the performance of corresponding specific tasks. Certain tasks, like grass cutting, are typically performed by lawn mowers. Lawn mowers themselves may have many different configurations to support the needs and budgets of consumers. Walk-behind lawn mowers are typically compact, have comparatively small engines and are relatively inexpensive. Meanwhile, at the other end of the spectrum, riding lawn mowers, such as lawn tractors, can be quite large. More recently, robotic mowers and/or remote controlled mowers have also become options for consumers to consider.

As technological capabilities have improved, various devices or sensors have been developed that are capable of employment to monitor various aspects of working conditions. However, even with the improvement of monitoring devices or sensors, robotic vehicles (e.g., robotic mowers) have been unable to determine the presence of grass based on various forms of data. Thus, it may be desirable to expand the capabilities of robotic vehicles to improve their utility and functionality.

BRIEF SUMMARY OF SOME EXAMPLES

Some example embodiments may therefore provide a robotic vehicle that is configured to incorporate multiple sensors to make the robotic vehicle capable of detecting grass by measuring edge data and/or frequency data. In this regard, in some cases, the robotic vehicle may include an onboard positioning module, a detection module, and a mapping module that may work together to give the robotic vehicle a comprehensive understanding of its current location and of the features or objects located in its environment. Moreover, the robotic vehicle may include sensors that enable the modules to collect and process data that can be used to identify grass on a parcel on which the robotic vehicle operates.

BRIEF DESCRIPTION OF THE SEVERAL VIEWS OF THE DRAWINGS

Figure 1:
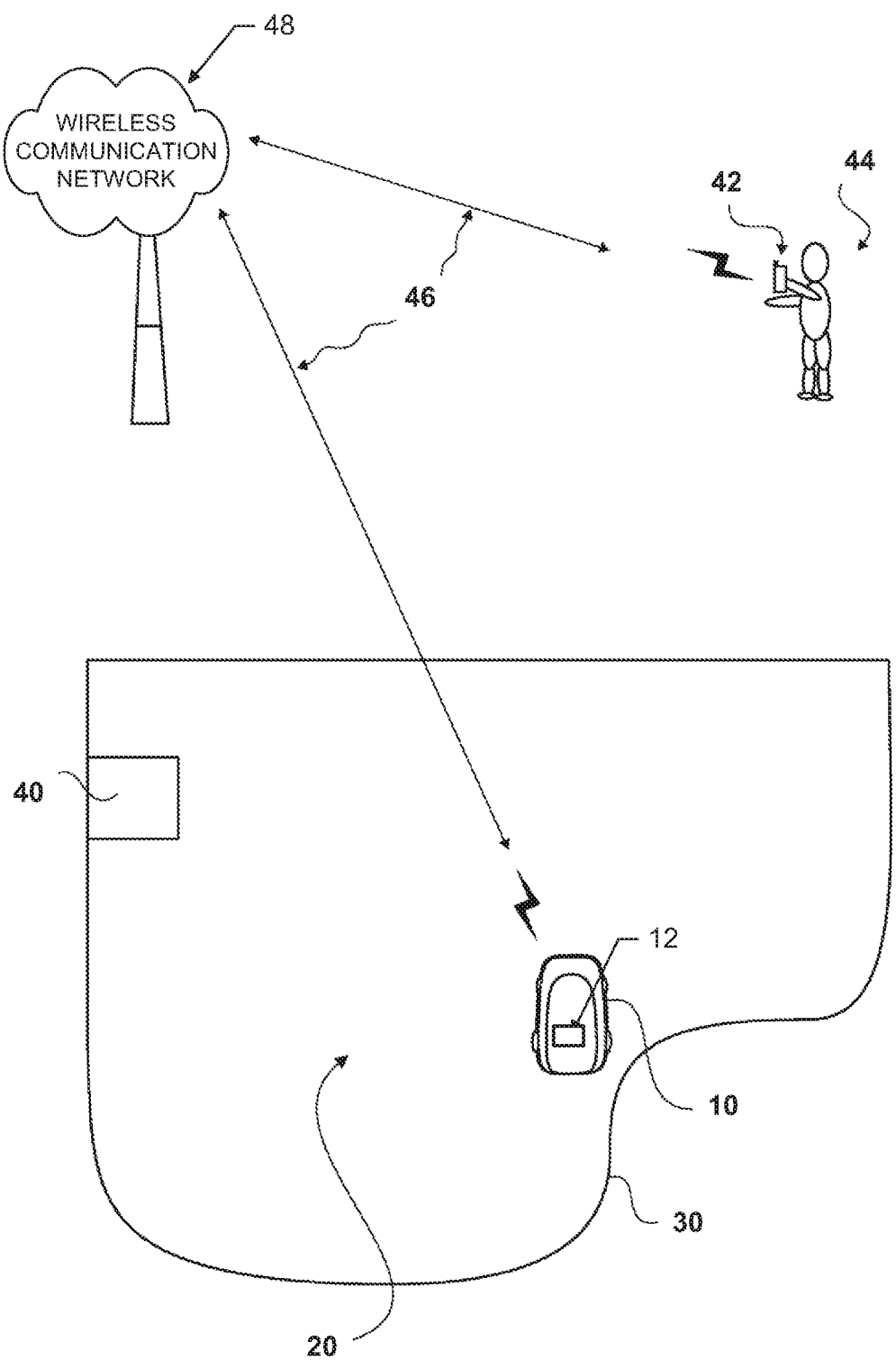
Figure 2:
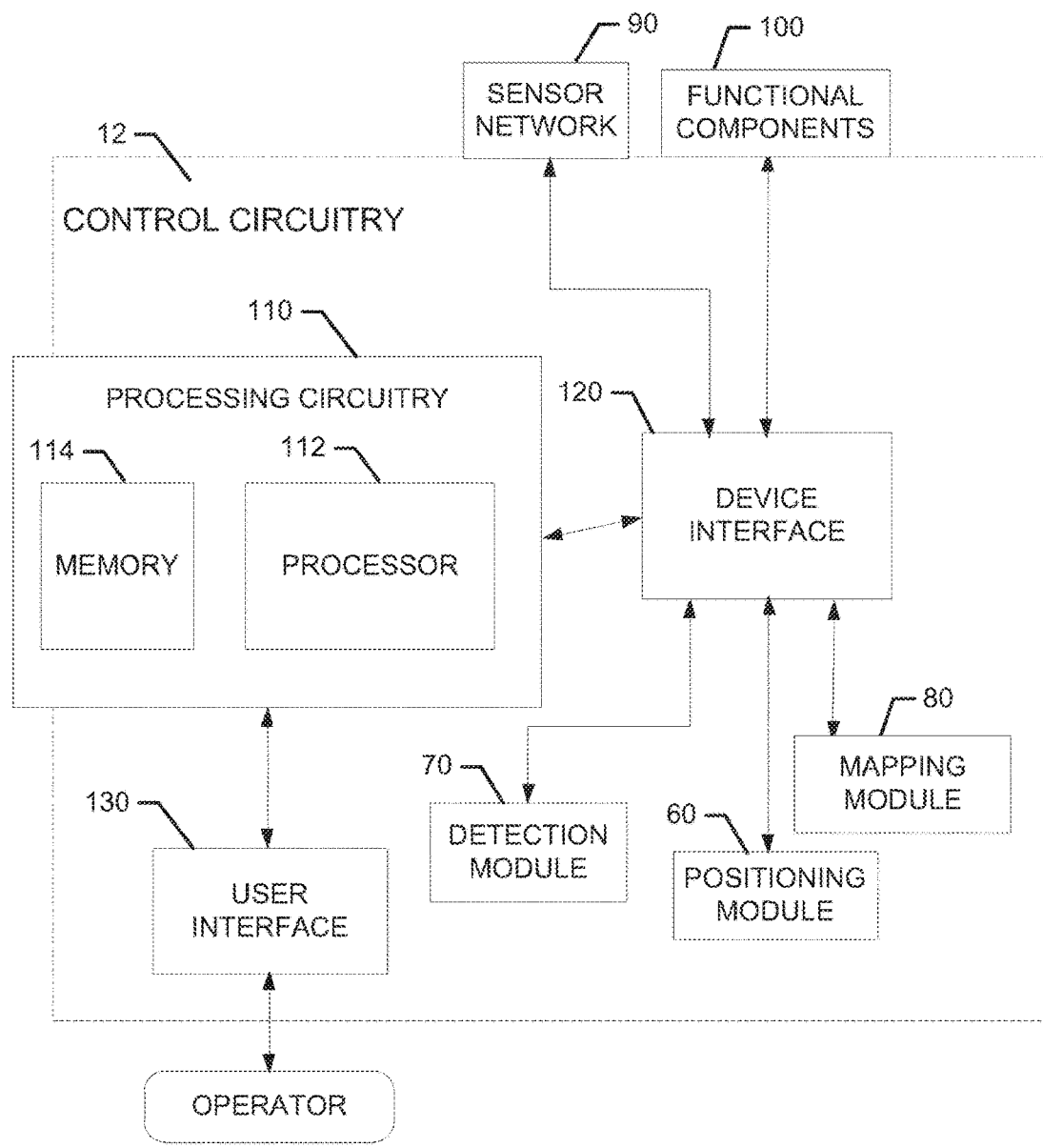
Figure 3:
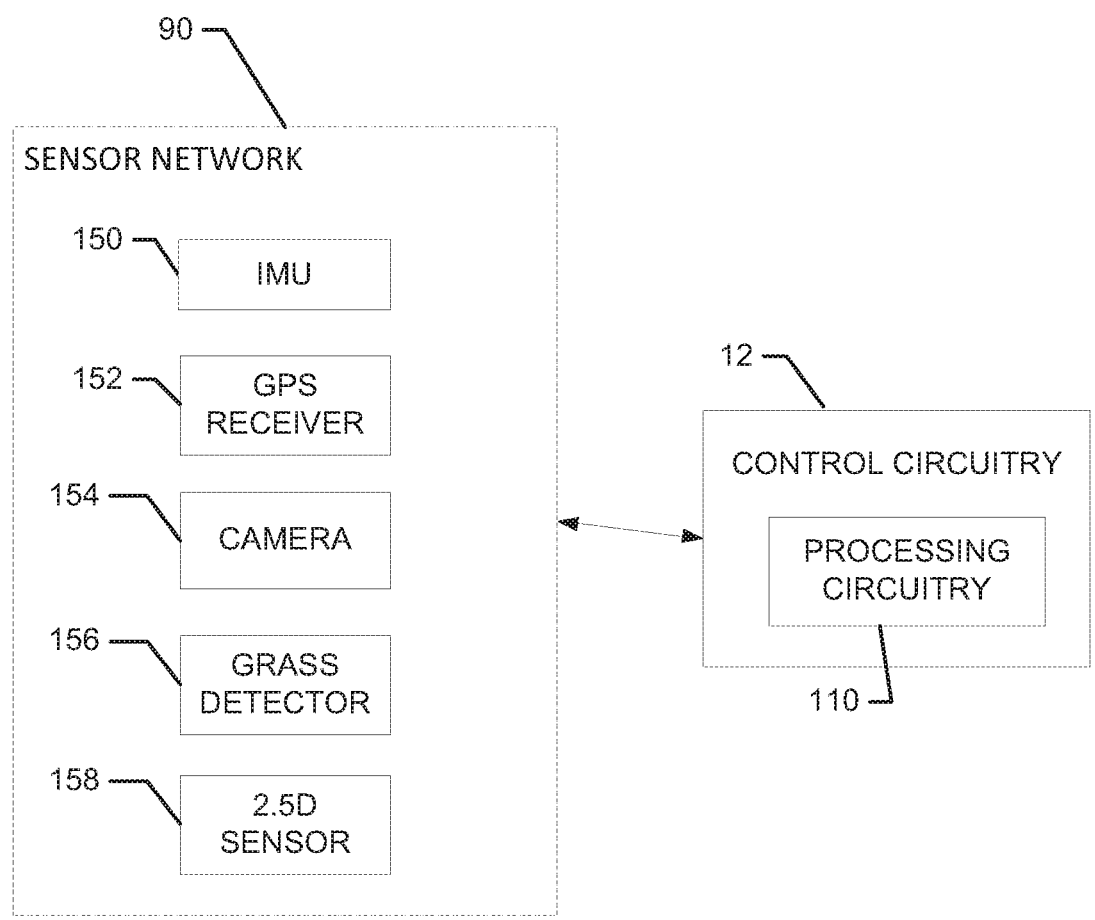
Figure 4:
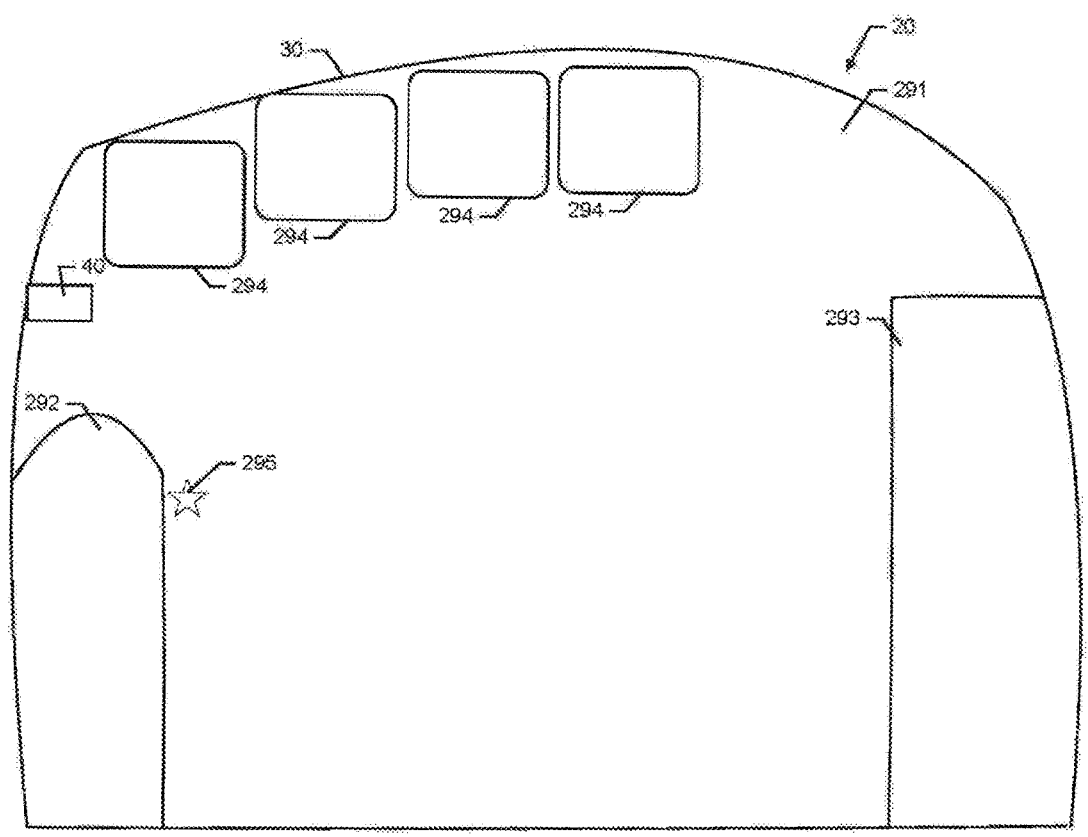
Figure 5:
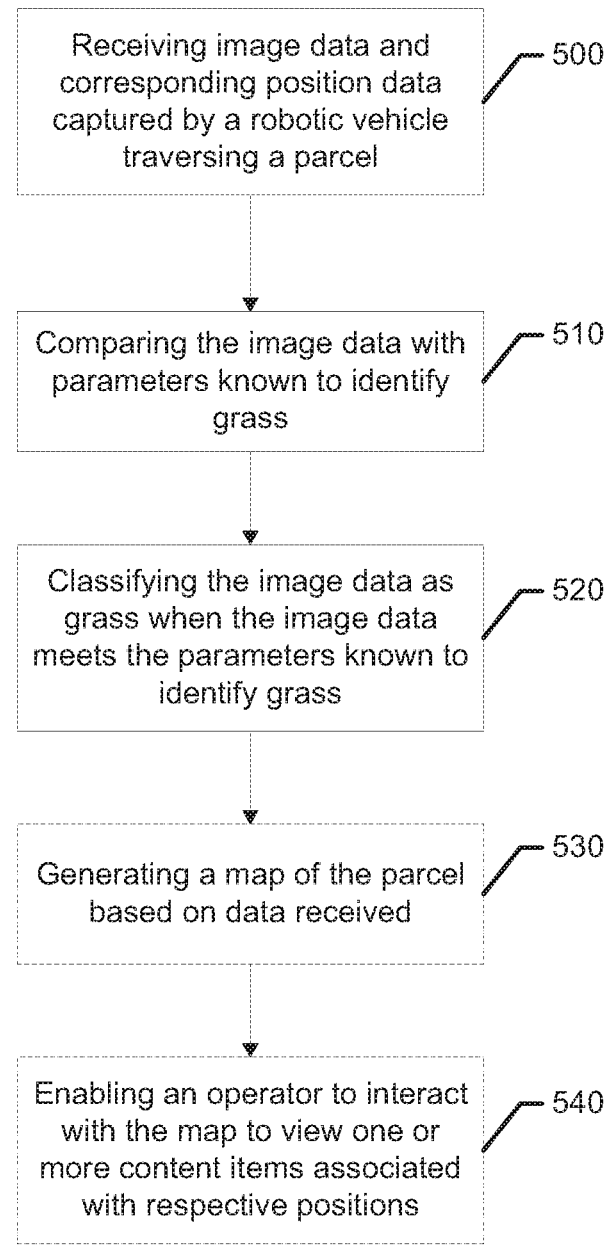
Figure 6:
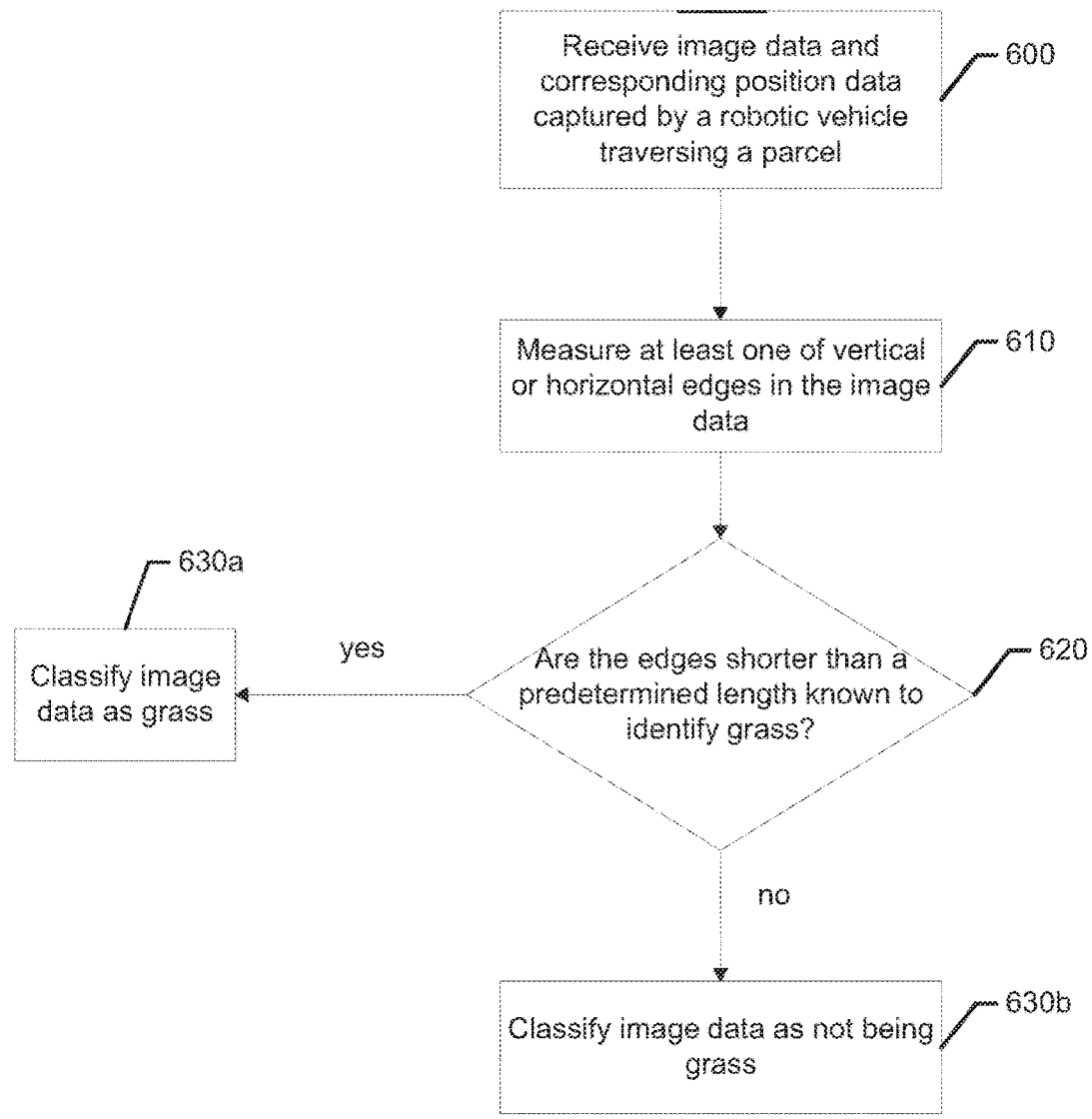
Figure 7:
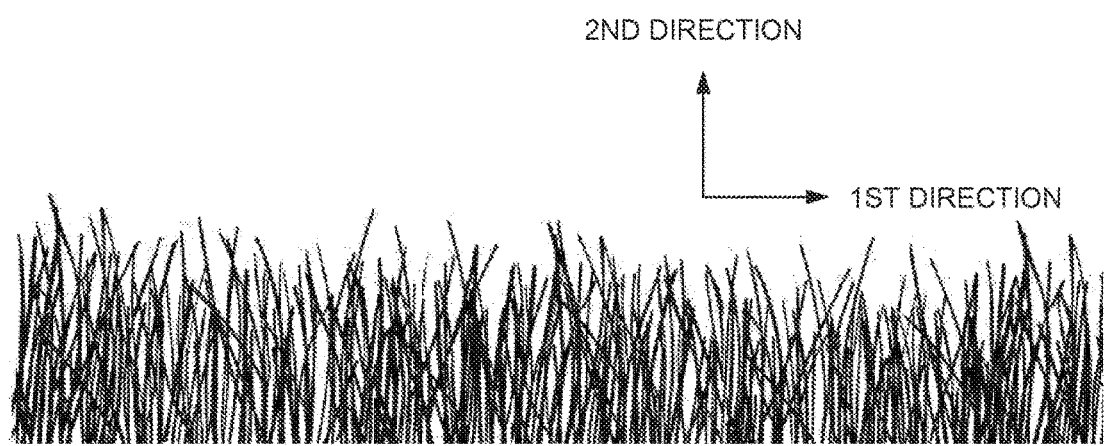
Figure 8:
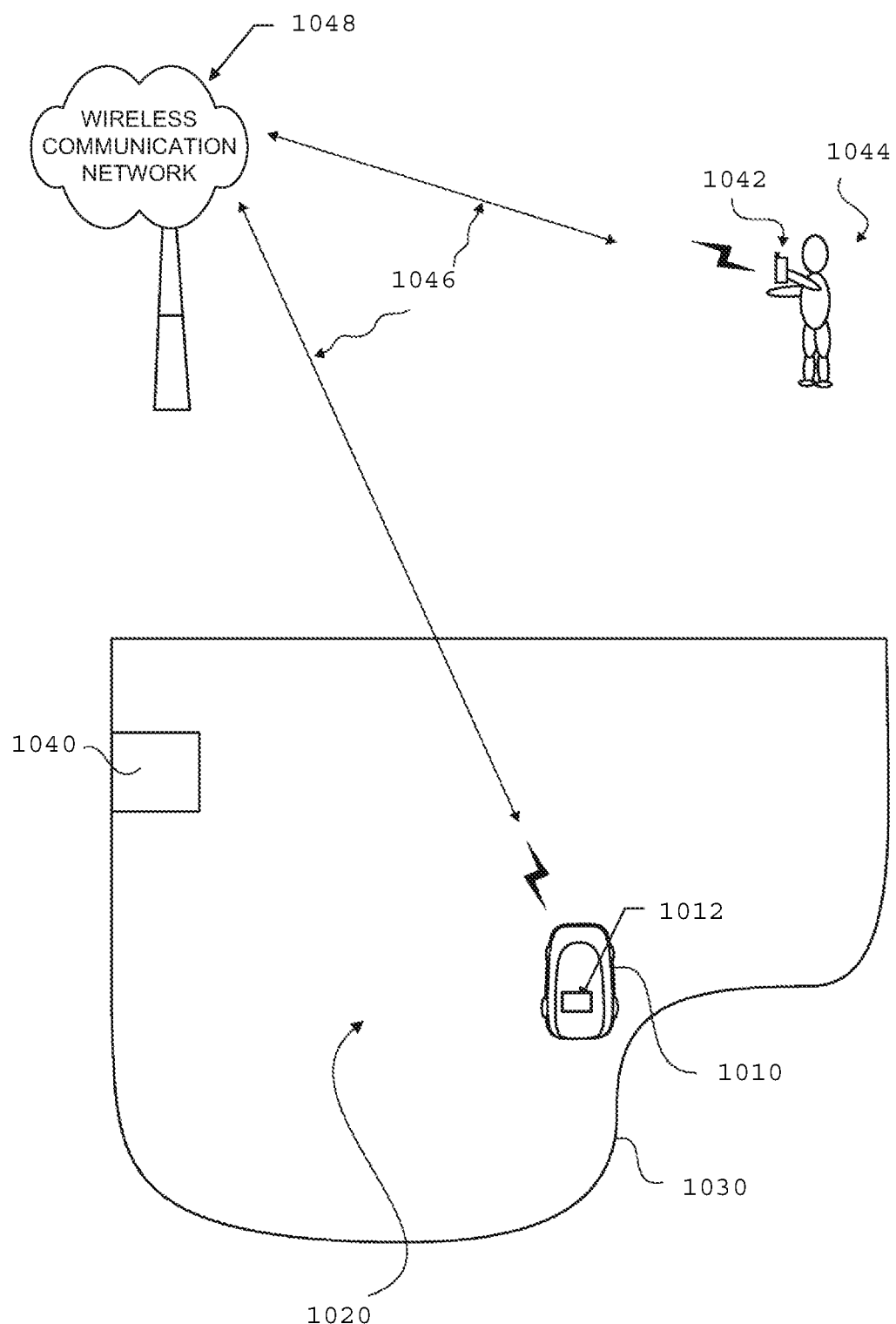
Figure 9:
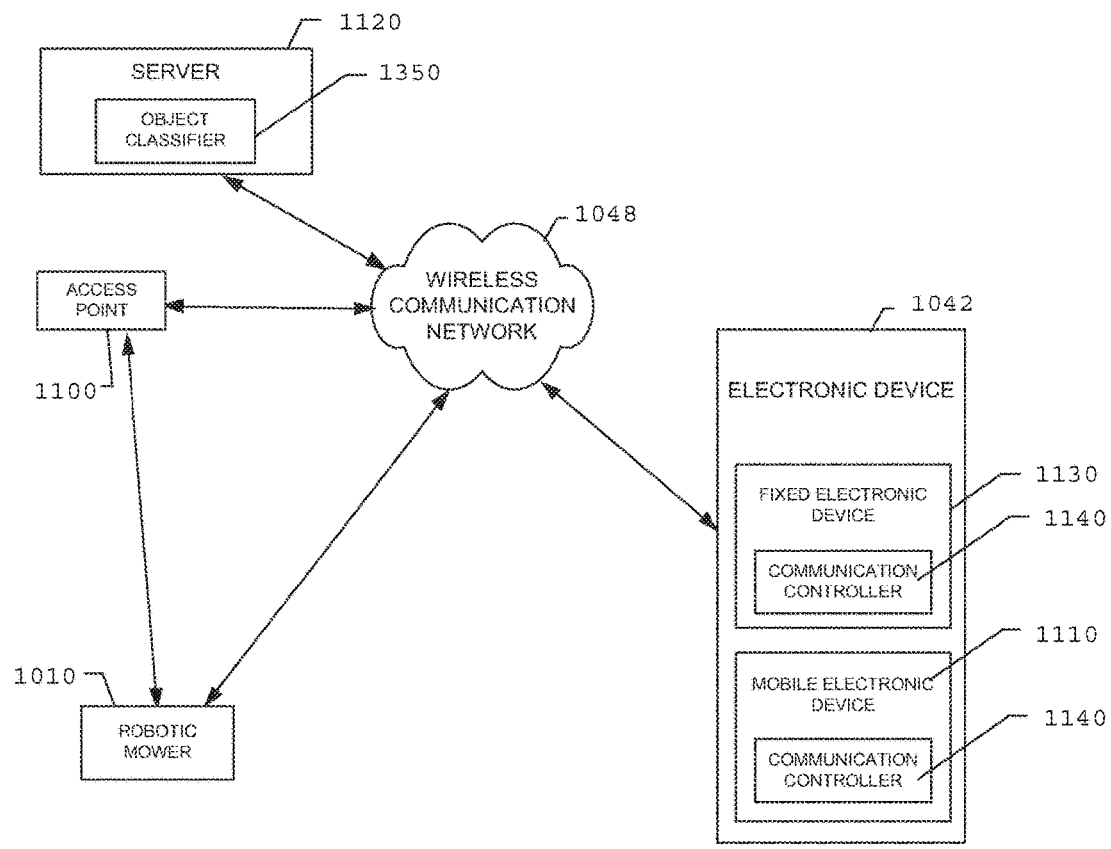
Figure 10:
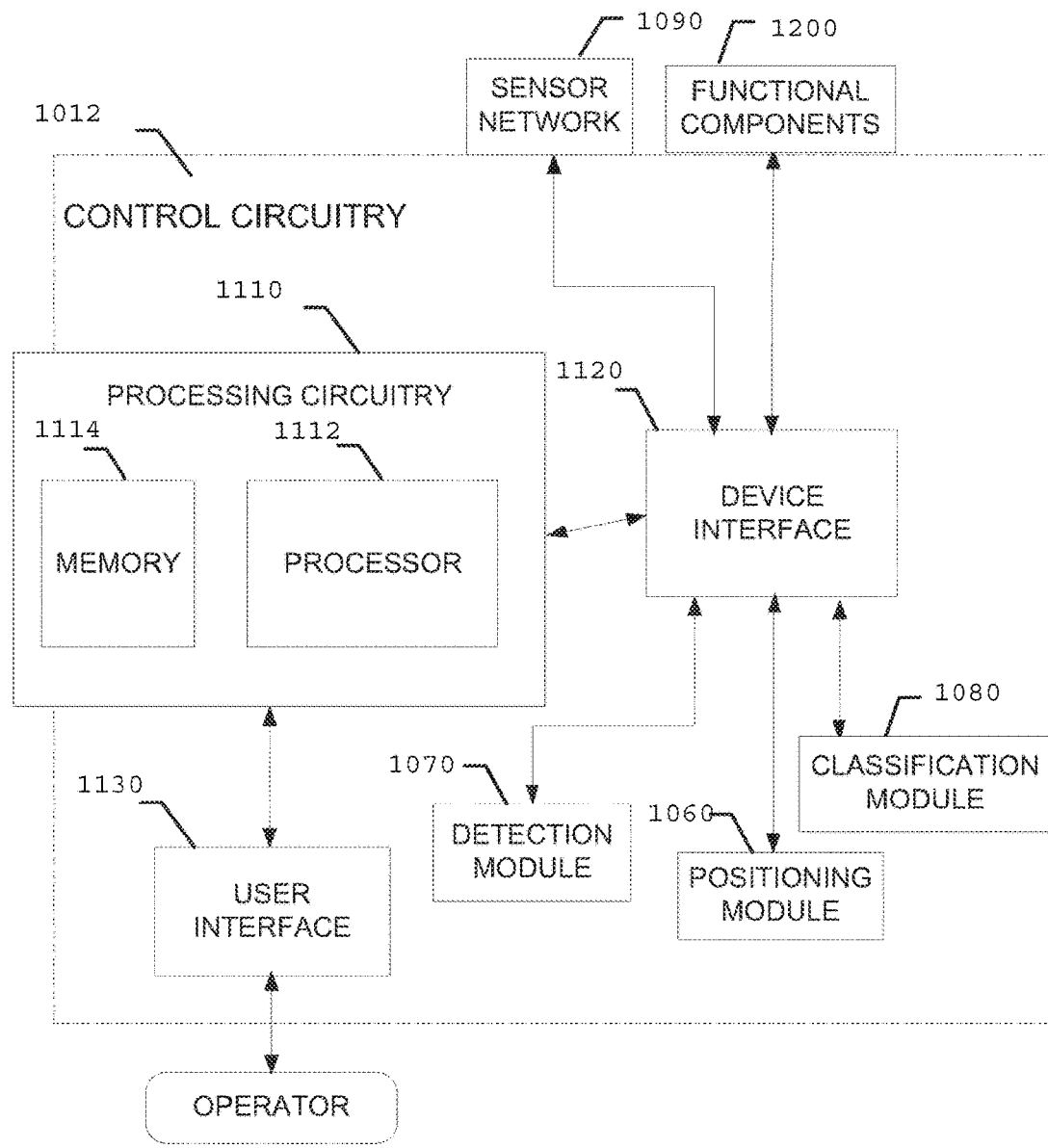
Figure 11:
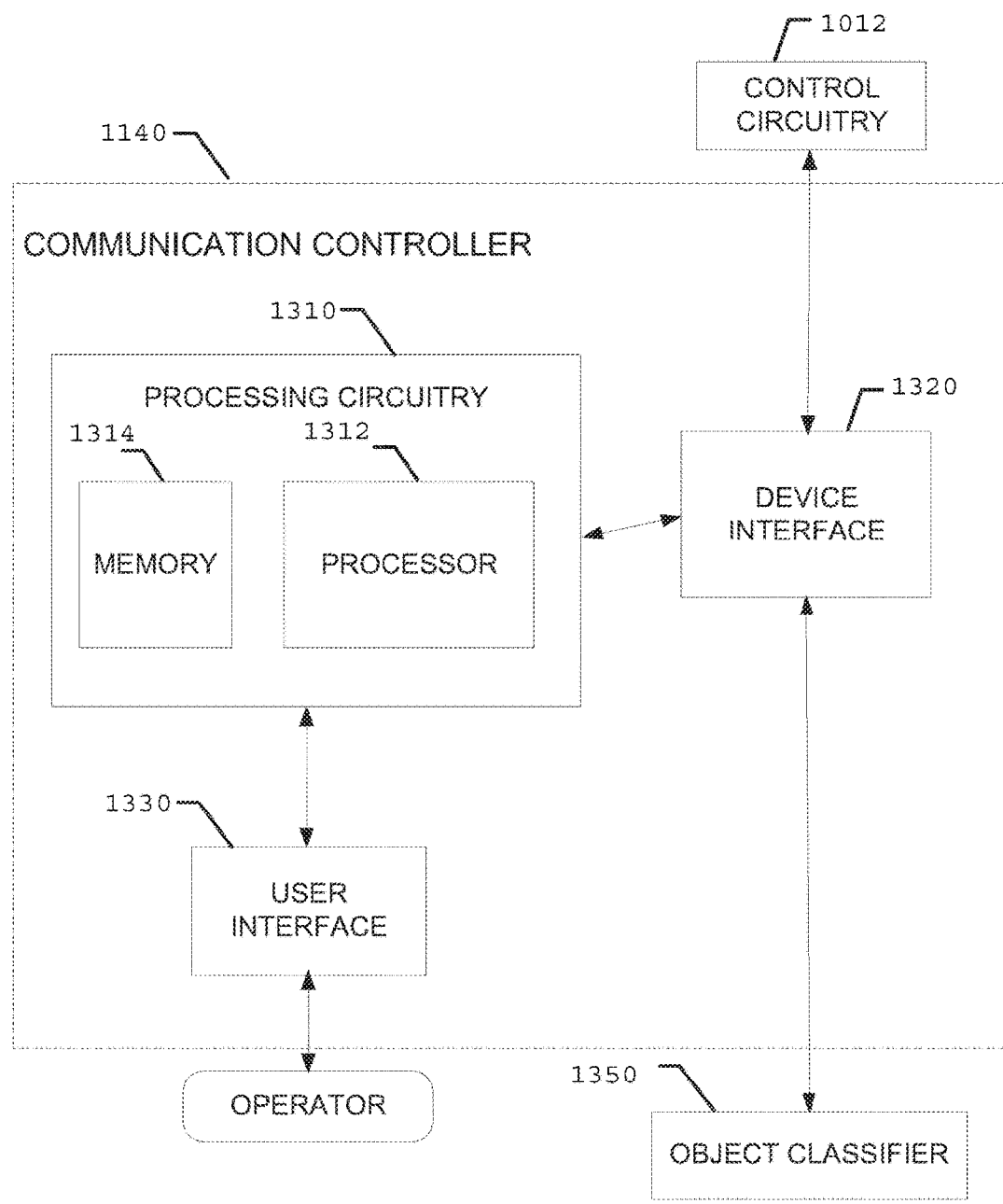
Figure 12:
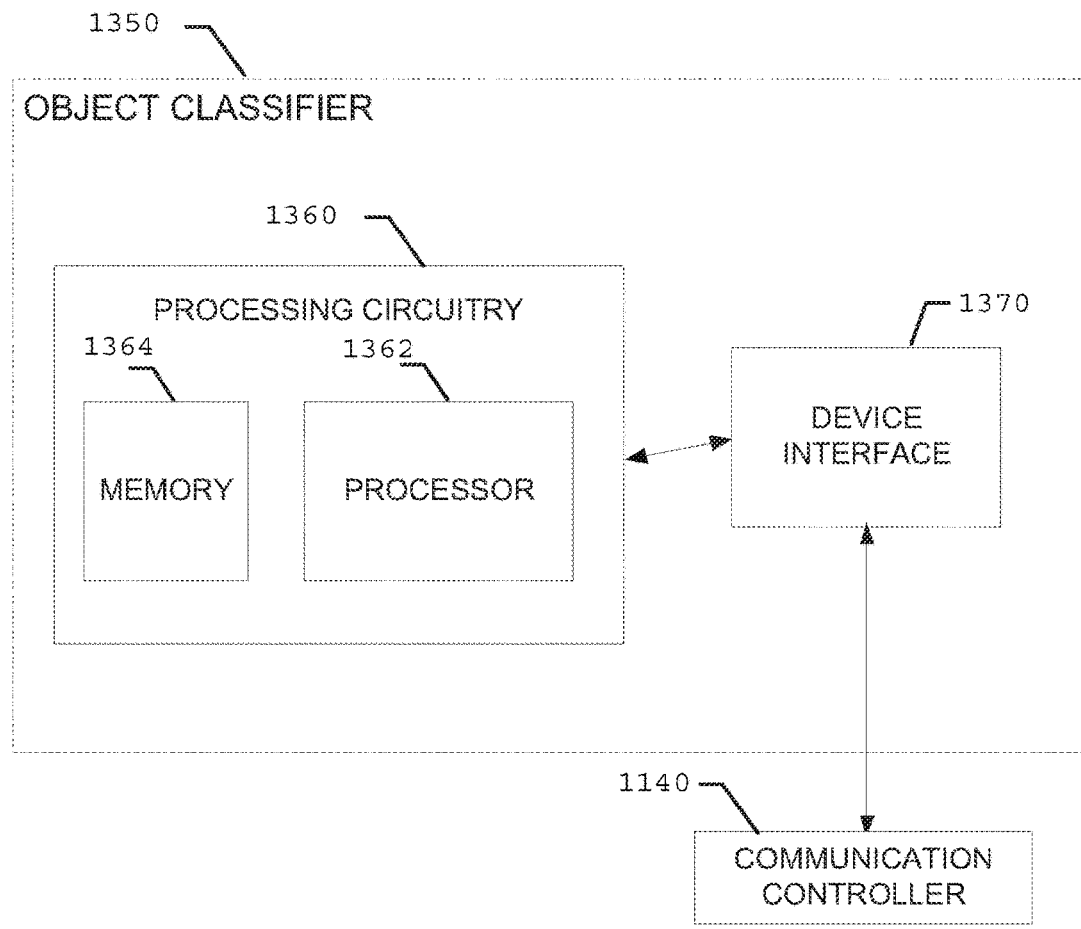
Figure 13:
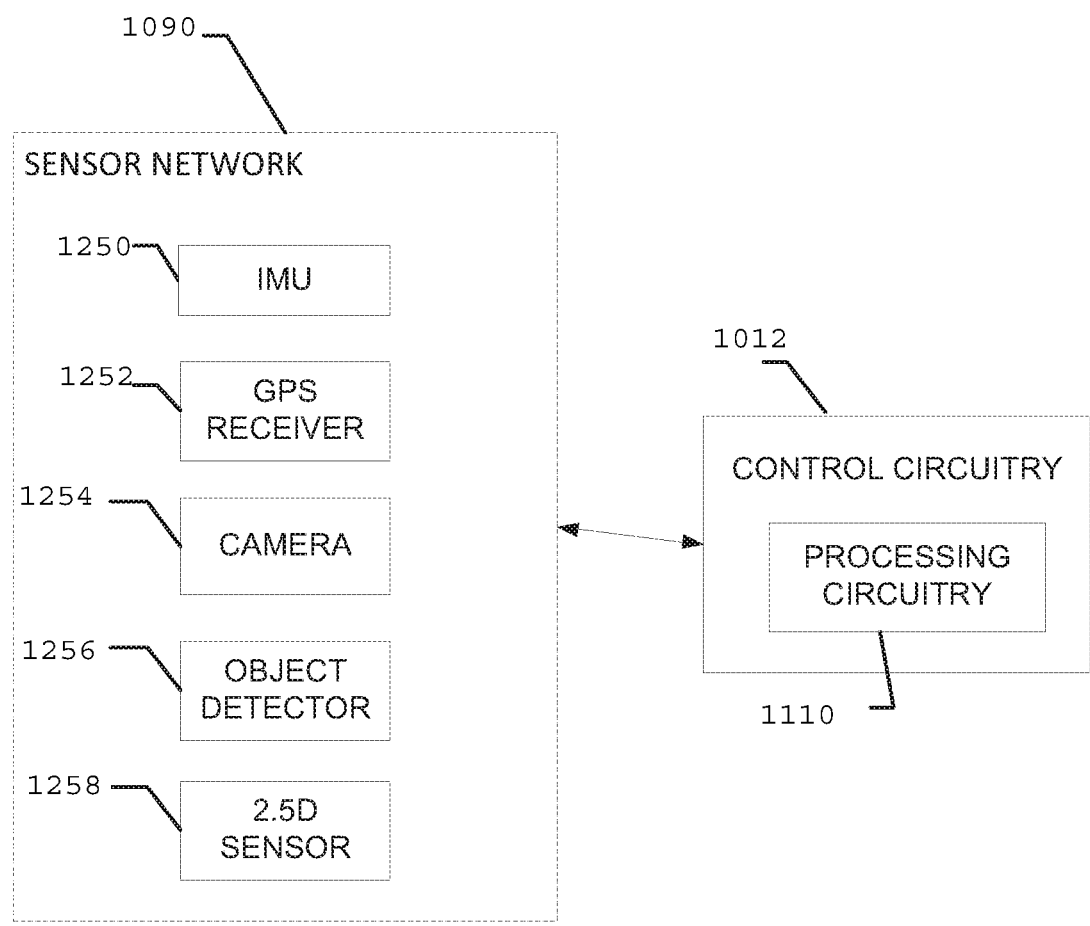
Figure 14:
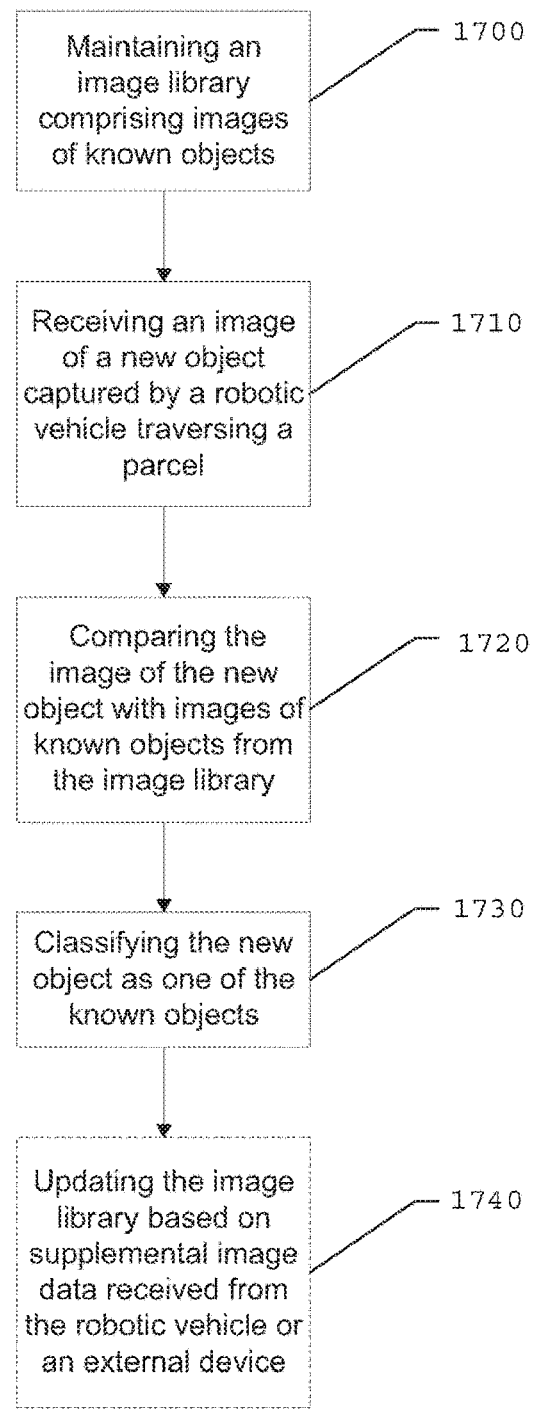
Figure 15:
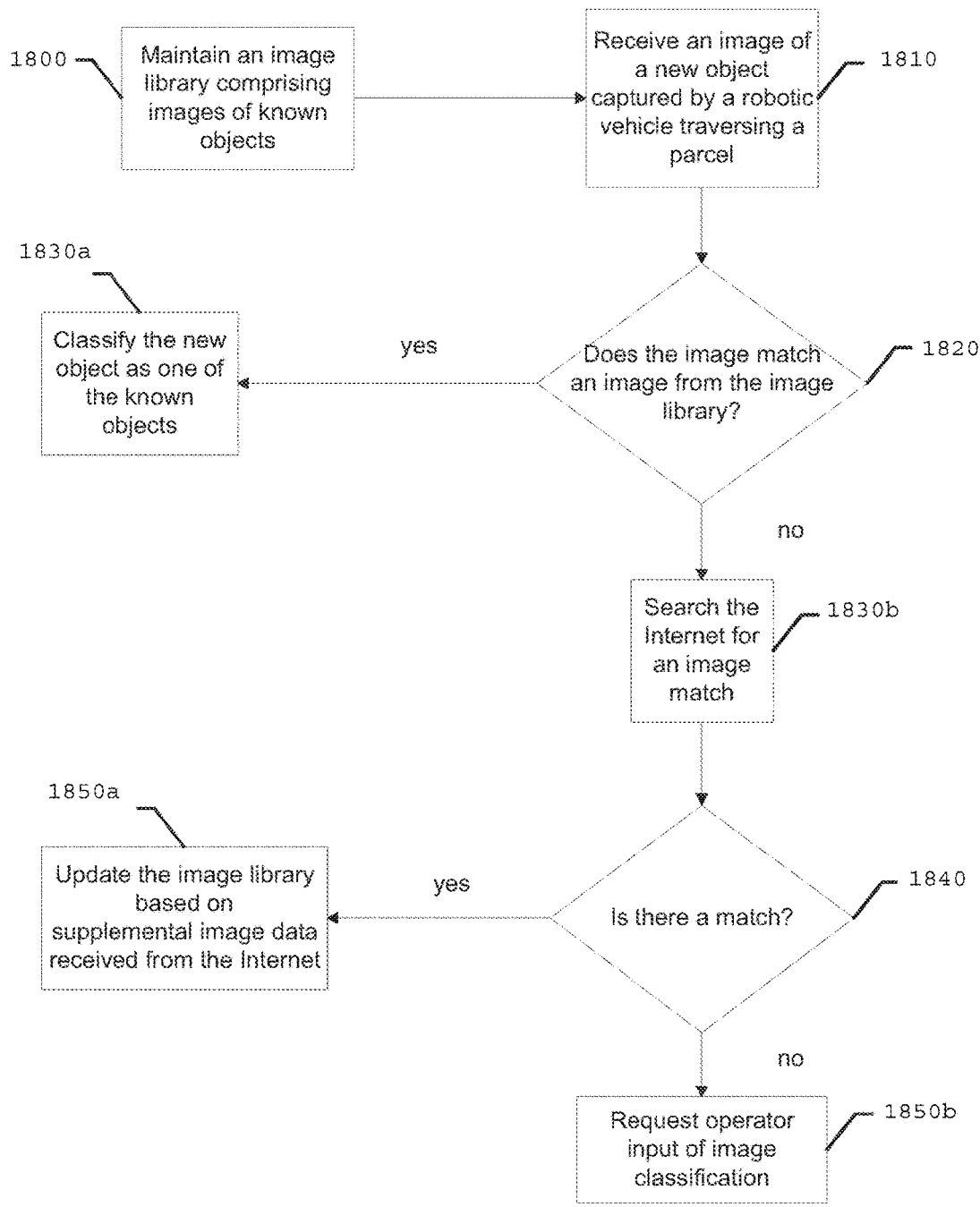

Having thus described the invention in general terms, reference will now be made to the accompanying drawings, which are not necessarily drawn to scale, and wherein:

FIG. 1 illustrates an example operating environment for a robotic mower;

FIG. 2 illustrates a block diagram of various components of control circuitry to illustrate some of the components that enable or enhance the functional performance of the robotic mower and to facilitate description of an example embodiment;

FIG. 3 illustrates a block diagram of some components that may be employed as part of a sensor network in accordance with an example embodiment;

FIG. 4 illustrates an example of map data that may be defined to represent all or a portion of the parcel according to an example embodiment;

FIG. 5 illustrates a block diagram of a method according to an example embodiment;

FIG. 6 illustrates a control flow diagram of one example of how the robotic mower can be operated to detect grass in a parcel in accordance with an example embodiment;

FIG. 7 illustrates a diagram of the orthogonally different directions present in grass structure;

FIG. 8 illustrates an example operating environment for a robotic mower;

FIG. 9 illustrates a block diagram of a communication network of the robotic mower according to an example embodiment;

FIG. 10 illustrates a block diagram of various components of control circuitry to illustrate some of the components that enable or enhance the functional performance of the robotic mower and to facilitate description of an example embodiment;

FIG. 11 illustrates a block diagram of various components of processing circuitry of an electronic device that can control the robotic mower remotely to illustrate some of the components that enable or enhance the functional performance of the electronic device and to facilitate description of an example embodiment;

FIG. 12 illustrates a block diagram of various components of processing circuitry of a object classifier to illustrate some of the components that enable or enhance the functional performance of the object classifier and to facilitate description of an example embodiment;

FIG. 13 illustrates a block diagram of some components that may be employed as part of a sensor network in accordance with an example embodiment;

FIG. 14 illustrates a block diagram of a method according to an example embodiment; and FIG. 15 illustrates a control flow diagram of one example of how the robotic mower can be operated to classify objects outside of a boundary of a parcel in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. Additionally, the term "yard maintenance" is meant to relate to any outdoor grounds improvement or maintenance related activity and need not specifically apply to activities directly tied to grass, turf or sod care. As used herein, operable coupling should be understood to relate to direct or indirect connection that, in either case, enables functional interconnection of components that are operably coupled to each other.

In an example embodiment, a robotic vehicle (e.g., a robotic mower, a mobile sensing device, a watering device and/or the like) is provided with a positioning module, detection module, mapping module, and a sensor network. The positioning module may be configured to utilize one or more sensors to determine a location of the robotic vehicle and direct continued motion of the robotic vehicle. The detection module may be configured to utilize one or more sensors to detect objects and/or boundaries that are located in the area around the robotic mower to enable the robotic mower to identify the objects or boundaries without physically contacting them. The mapping module may be configured to utilize one or more sensors to generate a map of the parcel, or to facilitate operation of the robotic mower relative to an existing (or previously generated) map of the parcel. The sensor network may be configured to collect data (e.g., image data). Other structures may also be provided, and other functions may also be performed as described in greater detail below.

FIG. 1 illustrates an example operating environment for a robotic mower 10 that may be employed in connection with an example embodiment. However, it should be appreciated that example embodiments may be employed on numerous other robotic vehicles, so the robotic mower 10 should be recognized as merely one example of such a vehicle. The robotic mower 10 may operate to cut grass on a parcel 20 (i.e., a land lot or garden), the boundary 30 of which may be defined using one or more physical boundaries (e.g., a fence, wall, curb and/or the like), a boundary wire, programmed location based boundaries or combinations thereof. When the boundary 30 is a boundary wire, the boundary wire may emit electrical signals that are detectable by the robotic mower 10 to inform the robotic mower 10 when the boundary 30 of the parcel 20 has been reached. Other robotic vehicles (e.g., a robotic watering vehicle) may operate in similarly defined areas, but an example embodiment will be described herein in connection with a robotic mower. However, it should be appreciated that example embodiments are not limited to application only on robotic mowers. Instead, example embodiments may also be practiced in connection with other robotic vehicles that operate within bounded regions.

The robotic mower 10 may be controlled, at least in part, via control circuitry 12 located onboard. The control circuitry 12 may include, among other things, a positioning module and a sensor network, which will be described in greater detail below. Accordingly, the robotic mower 10 may utilize the control circuitry 12 to define a path for coverage of the parcel 20 in terms of performing a task over specified portions or the entire parcel 20. In this regard, the positioning module may be used to guide the robotic mower 10 over the parcel 20 and to ensure that full coverage (of at least predetermined portions of the parcel 20) is obtained, while the sensor network may detect objects and/or gather data regarding the surroundings of the robotic mower 10 while the parcel 20 is traversed.

If a sensor network is employed, the sensor network may include sensors related to positional determination (e.g., a GPS receiver, an accelerometer, a camera, an ultrasonic sensor, a laser scanner and/or the like). Thus, for example, positional determinations may be made using GPS, inertial navigation, optical flow, visual location (e.g., VSLAM) and/or other positioning techniques or combinations thereof. Accordingly, the sensors may be used, at least in part, for determining the location of the robotic mower 10 relative to boundaries or other points of interest (e.g., a starting point or other key features) of the parcel 20, or determining a position history or track of the robotic mower 10 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 20.

In an example embodiment, the robotic mower 10 may be battery powered via one or more rechargeable batteries. Accordingly, the robotic mower 10 may be configured to return to a charge station 40 that may be located at some position on the parcel 20 in order to recharge the batteries. The batteries may power a drive system and a blade control system of the robotic mower 10. However, the control circuitry 12 of the robotic mower 10 may selectively control the application of power or other control signals to the drive system and/or the blade control system to direct the operation of the drive system and/or blade control system. Accordingly, movement of the robotic mower 10 over the parcel 20 may be controlled by the control circuitry 12 in a manner that enables the robotic mower 10 to systematically traverse the parcel while operating a cutting blade to cut the grass on the parcel 20. In cases where the robotic vehicle is not a mower, the control circuitry 12 may be configured to control another functional or working assembly that may replace the blade control system and blades.

In some embodiments, the control circuitry 12 and/or a communication node at the charge station 40 may be configured to communicate wirelessly with an electronic device 42 (e.g., a personal computer, a cloud based computer, server, mobile telephone, PDA, tablet, smart phone, and/or the like) of a remote operator 44 (or user) via wireless links 46 associated with a wireless communication network 48. The wireless communication network 48 may provide operable coupling between the remote operator 44 and the robotic mower 10 via the electronic device 42, which may act as a remote control device for the robotic mower 10. However, it should be appreciated that the wireless communication network 48 may include additional or internal components that facilitate the communication links and protocols employed. Thus, some portions of the wireless communication network 48 may employ additional components and connections that may be wired and/or wireless. For example, the charge station 40 may have a wired connection to a computer or server that is connected to the wireless communication network 48, which may then wirelessly connect to the electronic device 42. As another example, the robotic mower 10 may wirelessly connect to the wireless communication network 48 (directly or indirectly) and a wired connection may be established between one or more servers of the wireless communication network 48 and a PC of the remote operator 44. In some embodiments, the wireless communication network 48 may be a data network, such as a local area network (LAN), a metropolitan area network (MAN), a wide area network (WAN) (e.g., the Internet), and/or the like, which may couple the robotic mower 10 to devices such as processing elements (e.g., personal computers, server computers or the like) or databases. Accordingly, communication between the wireless communication network 48 and the devices or databases (e.g., servers, electronic device 42, control circuitry 12) may be accomplished by either wireline or wireless communication mechanisms and corresponding protocols.

FIG. 2 illustrates a block diagram of various components of the control circuitry 12 to illustrate some of the components that enable or enhance the functional performance of the robotic mower 10 and to facilitate description of an example embodiment. In some example embodiments, the control circuitry 12 may include or otherwise be in communication with a vehicle positioning module 60, a detection module 70 (e.g., for detecting objects, borders and/or the like), and a mapping module 80. As mentioned above, the vehicle positioning module 60, the detection module 70, and the mapping module 80 may work together to give the robotic mower 10 a comprehensive understanding of its environment, and enable it to detect grass.

Any or all of the vehicle positioning module 60, the detection module 70, and the mapping module 80 may be part of a sensor network 90 of the robotic mower 10. However, in some cases, any or all of the vehicle positioning module 60, the detection module 70, and the mapping module 80 may be separate from but otherwise in communication with the sensor network 90 to facilitate operation of each respective module.

In some examples, one or more of the vehicle positioning module 60, the detection module 70, and the mapping module 80 may further include or be in communication with a camera 154 other imaging device. The camera 154 may be a part of the sensor network 90, part of any of the modules described above, or may be in communication with one or more of the modules to enhance, enable or otherwise facilitate operation of respective ones of the modules. The camera 154 may include an electronic image sensor configured to store captured image data (e.g., in memory 114). Image data recorded by the camera 154 may be in the visible light spectrum or in other portions of the electromagnetic spectrum (e.g., IR camera). In some cases, the camera 154 may actually include multiple sensors configured to capture data in different types of images (e.g., RGB and IR sensors). The camera 154 may be configured to capture still images and/or video data.

The robotic mower 10 may also include one or more functional components 100 that may be controlled by the control circuitry 12 or otherwise be operated in connection with the operation of the robotic mower 10. The functional components 100 may include a wheel assembly (or other mobility assembly components), one or more cutting blades and corresponding blade control components, and/or other such devices. In embodiments where the robotic vehicle is not a mower, the functional components 100 may include equipment for performing various lawn care functions such as, for example, taking soil samples, operating valves, distributing water, seed, powder, pellets or chemicals, and/or other functional devices and/or components.

The control circuitry 12 may include processing circuitry 110 that may be configured to perform data processing or control function execution and/or other processing and management services according to an example embodiment of the present invention. In some embodiments, the processing circuitry 110 may be embodied as a chip or chip set. In other words, the processing circuitry 110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 110 may include one or more instances of a processor 112 and memory 114 that may be in communication with or otherwise control a device interface 120 and, in some cases, a user interface 130. As such, the processing circuitry 110 may be embodied as a circuit chip (e.g., an integrated circuit chip) configured (e.g., with hardware, software or a combination of hardware and software) to perform operations described herein. However, in some embodiments, the processing circuitry 110 may be embodied as a portion of an on-board computer. In some embodiments, the processing circuitry 110 may communicate with electronic components and/or sensors of the robotic mower 10 via a single data bus. As such, the data bus may connect to a plurality or all of the switching components, sensory components and/or other electrically controlled components of the robotic mower 10.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform the operations described herein.

In an example embodiment, the processor 112 (or the processing circuitry 110) may be embodied as, include or otherwise control the vehicle positioning module 60, the detection module 70, and the mapping module 80. As such, in some embodiments, the processor 112 (or the processing circuitry 110) may be said to cause each of the operations described in connection with the vehicle positioning module 60, the detection module 70, and the mapping module 80 by directing the vehicle positioning module 60, the detection module 70, and the mapping module 80, respectively, to undertake the corresponding functionalities responsive to execution of instructions or algorithms configuring the processor 112 (or processing circuitry 110) accordingly. These instructions or algorithms may configure the processing circuitry 110, and thereby also the robotic mower 10, into a tool for driving the corresponding physical components for performing corresponding functions in the physical world in accordance with the instructions provided.

In an exemplary embodiment, the memory 114 may include one or more non-transitory memory devices such as, for example, volatile and/or non-volatile memory that may be either fixed or removable. The memory 114 may be configured to store information, data, applications, instructions or the like for enabling the vehicle positioning module 60, the detection module 70, and the mapping module 80 to carry out various functions in accordance with exemplary embodiments of the present invention. For example, the memory 114 could be configured to buffer input data for processing by the processor 112. Additionally or alternatively, the memory 114 could be configured to store instructions for execution by the processor 112. As yet another alternative, the memory 114 may include one or more databases that may store a variety of data sets responsive to input from various sensors or components of the robotic mower 10. Among the contents of the memory 114, applications may be stored for execution by the processor 112 in order to carry out the functionality associated with each respective application.

The applications may include applications for controlling the robotic mower 10 relative to various operations including determining an accurate position of the robotic mower 10 (e.g., using one or more sensors of the vehicle positioning module 60). Alternatively or additionally, the applications may include applications for controlling the robotic mower 10 relative to various operations including determining the existence of objects (e.g., using one or more sensors of the detection module 70). Alternatively or additionally, the applications may include applications for controlling the robotic mower 10 relative to various operations including mapping a parcel or operating the robotic mower 10 relative to a map (generated or provided) (e.g., using one or more sensors of the mapping module 80). Alternatively or additionally, the applications may include applications for controlling the camera 154 and/or processing image data gathered by the camera 154 to execute or facilitate execution of other applications that drive or enhance operation of the robotic mower 10 relative to various activities described herein.

The user interface 130 (if implemented) may be in communication with the processing circuitry 110 to receive an indication of a user input at the user interface 130 and/or to provide an audible, visual, mechanical or other output to the user. As such, the user interface 130 may include, for example, a display, one or more buttons or keys (e.g., function buttons), and/or other input/output mechanisms (e.g., microphone, speakers, cursor, joystick, lights and/or the like).

The device interface 120 may include one or more interface mechanisms for enabling communication with other devices either locally or remotely. In some cases, the device interface 120 may be any means such as a device or circuitry embodied in either hardware, or a combination of hardware and software that is configured to receive and/or transmit data from/to sensors or other components in communication with the processing circuitry 110. In some example embodiments, the device interface 120 may provide interfaces for communication of data to/from the control circuitry 12, the vehicle positioning module 60, the detection module 70, the mapping module 80, the sensor network 90, the camera 154 and/or other functional components 100 via wired or wireless communication interfaces in a real-time manner, as a data package downloaded after data gathering or in one or more burst transmission of any kind.

Each of the vehicle positioning module 60, the detection module 70, and the mapping module 80 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 12 of the robotic mower 10. The modules may share some parts of the hardware and/or instructions that form each module, or they may be distinctly formed. As such, the modules and components thereof are not necessarily intended to be mutually exclusive relative to each other from a compositional perspective.

The vehicle positioning module 60 (or "positioning module") may be configured to utilize one or more sensors (e.g., of the sensor network 90) to determine a location of the robotic mower 10 and direct continued motion of the robotic mower 10 to achieve appropriate coverage of the parcel 20. As such, the robotic mower 10 (or more specifically, the control circuitry 12) may use the location information to determine a mower track and/or provide full coverage of the parcel 20 to ensure the entire parcel is mowed (or otherwise serviced). The vehicle positioning module 60 may therefore be configured to direct movement of the robotic mower 10, including the speed and direction of the robotic mower 10. The vehicle positioning module 60 may also employ such sensors to attempt to determine an accurate current location of the robotic mower 10 on the parcel 20 (or generally).

Various sensors of sensor network 90 of the robotic mower 10 may be included as a portion of, or otherwise communicate with, the vehicle positioning module 60 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the vehicle positioning module 60.

In an example embodiment, the detection module 70 may be configured to utilize one or more sensors (e.g., of the sensor network 90) to detect objects that are located in the area around the robotic mower 10 to enable the robotic mower 10 to identify the objects without physically contacting them. Thus, the detection module 70 may enable object avoidance as well as allow the robotic mower 10 to avoid contact with boundaries, buildings, fences, and/or the like while covering the parcel 20. As such, the robotic mower 10 (or more specifically, the control circuitry 12) may use object/boundary detection information to alter a mower track and/or report impediments to providing full coverage of the parcel 20. The detection module 70 may therefore be configured to detect static (i.e., fixed or permanent) and/or dynamic (i.e., temporary or moving) objects in the vicinity of the robotic mower 10. In some cases, the detection module 70 may be further configured to classify or identify the objects detected (e.g., by type, as known or unknown, as static or dynamic objects, as specific objects, and/or the like). Moreover, in some cases, the detection module 70 may interact with the vehicle positioning module 60 to utilize one or more objects to facilitate positioning or grass detection for the robotic mower 10.

Various sensors of sensor network 90 of the robotic mower 10 may be included as a portion of, or otherwise communicate with, the detection module 70 to, for example, determine the existence of objects, determine range to objects, determine direction to objects, classify objects, and/or the like.

In an example embodiment, the mapping module 80 may be configured to utilize one or more sensors (e.g., of the sensor network 90) to generate a map of the parcel 20, or to facilitate operation of the robotic mower 10 relative to an existing (or previously generated) map of the parcel 20. Thus, the mapping module 80 may include components that enable a map to be generated from sensor data gathered by the robotic mower 10 responsive to movement of the robotic mower 10 about the parcel 20. Alternatively or additionally, the mapping module 80 may enable the robotic mower 10 to understand or orient itself relative to an existing map. Thus, for example, the mapping module 80 may enable data gathered to be used to generate a map or may enable such data to be correlated to map data to allow the robotic mower 10 to reconcile its position with a map. Various sensors of sensor network 90 of the robotic mower 10 may be included as a portion of, or otherwise communicate with, the mapping module 80 to, for example, build a graphical display of the parcel 20 and the various objects, boundaries, zones or other differentiating features of the parcel 20 so that the graphical display can be used for future operation or current operation of the robotic mower 10, or to facilitate the consumption of data that may be correlated to various map locations.

In an example embodiment, the sensor network 90 may provide data to the modules described above to facilitate execution of the functions described above, and/or any other functions that the modules may be configurable to perform. In some cases, the sensor network 90 may include (perhaps among other things) any or all of inertial measurement unit (IMU) 150, a GPS receiver 152, a camera 154, a grass detector 156, and a 2.5D sensor 158, as shown in FIG. 3. In this regard, FIG. 3 illustrates a block diagram of some components that may be employed as part of the sensor network 90 in accordance with an example embodiment.

The sensor network 90 may include independent devices with on-board processing that communicate with the processing circuitry 110 of the control circuitry 12 via a single data bus, or via individual communication ports. However, in some cases, one or more of the devices of the sensor network 90 may rely on the processing power of the processing circuitry 110 of the control circuitry 12 for the performance of their respective functions. As such, in some cases, one or more of the sensors of the sensor network 90 (or portions thereof) may be embodied as portions of the mapping module 80, the detection module 70, and/or the positioning module 60, and any or all of such sensors may employ the camera 154.

The IMU 150 may include one or more and any or all of combinations of accelerometers, odometers, gyroscopes, magnetometers, compasses, and/or the like. As such, the IMU 150 may be configured to determine velocity, direction, orientation and/or the like so that dead reckoning and/or other inertial navigation determinations can be made by the control circuitry 12. The IMU 150 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 10 relative to a known location. For example, navigation conducted via the IMU 150 may be used for robotic mower 10 operation for a period of time, and then a correction may be inserted when a GPS fix is obtained on robotic mower position. As an example alternative, the IMU 150 determined position may be updated every time the robotic mower 10 returns to the charge station 40 (which may be assumed to be at a fixed location). In still other examples, known reference points may be disposed at one or more locations on the parcel 20 and the robotic mower 10 may get a fix relative to any of such known reference points when the opportunity presents itself. The IMU 150 determined position may then be updated with the more accurate fix information.

In some embodiments, the GPS receiver 152 may be embodied as a real time kinematic (RTK)—GPS receiver. As such, the GPS receiver 152 may employ satellite based positioning in conjunction with GPS, GLONASS, Galileo, GNSS, and/or the like to enhance accuracy of the GPS receiver 152. In some cases, carrier-phase enhancement may be employed such that, for example, in addition to the information content of signals received, the phase of the carrier wave may be examined to provide real-time corrections that can enhance accuracy.

In an example embodiment, the robotic mower 10 is provided with a camera 154 in addition to any other sensors or functional components 100 that the robotic mower 10 may carry. The camera 154, and perhaps also other sensor equipment, may be configured to gather image data and other information during operation of the robotic mower 10 on the lawn (i.e., on the parcel 20). The image data may be of ordinary yard objects (e.g., grass, flowers, gravel, etc.).

The grass detector 156 may be configured to detect grass using any of a variety of different detection methods related to the particular features that the grass detector 156 is configured to perceive. In this regard, the grass detector 156 may be configured to detect grass based on structural and configured components that are able to perceive chlorophyll, specific colors, and/or structures that may be used to indicate grass.

As mentioned above, in some cases, the grass detector 156 may be embodied as a chlorophyll detector. A chlorophyll detector may be a tube that emits light from an LED at a specific wavelength (e.g., 660 nm and 940 nm) to measure reflected light. A normalized difference vegetation index (NVDI) algorithm may then be employed to analyze the reflected light to determine if chlorophyll is present. If chlorophyll is present for a down-looking tube, it may be assumed that the robotic mower 10 is over grass instead of over asphalt, concrete, wood, stone, gravel or other possible surfaces over which the robotic mower 10 may transit in the parcel 20.

If the grass detector 156 is instead configured to identify grass based on passively receiving image data and analyzing the image data for colors in the images to distinguish grass from other materials, if possible. In some cases, the camera 154 may be used to capture image data. The image data may include RGB values for various pixels in each image. The RGB values may be transformed into hue, saturation and value (HSV) parameters. A center hue and width may be defined, and saturation and value thresholds could be computed. A determination as to whether a particular area is grass may then be determined based on a comparison of saturation and value parameters to the thresholds. In some cases, the camera 154 may also capture IR information and both RGB and IR values can be analyzed for color based grass detection.

In some cases, as an alternative to (or in addition to) using color, structure (and/or elevation) may be used to facilitate detection of grass. In this regard, when analyzed in an image, the structure of grass is such that it appears to be more random that other structures such as, for example, leaves, stones, branches or other objects of at least a certain size. Thus, for example, an edge detection algorithm could be employed to identify edges in images (e.g., via filtering), and then for each edge-pixel, calculate the distance to other edges nearby. If the edge distance calculation is small, then there are a lot of edges and the material being analyzed may be grass. If the edge distance calculation is large, then the material is likely not grass. In some embodiments and as illustrated in FIG. 7, it may be possible to measure edges distinctly in vertical and horizontal directions (or at least in orthogonally different directions). For example, to determine whether an object may be grass, a method may comprise extracting edge features extending in a first direction, extracting edge features extending in a second direction orthogonal to the first direction, determining distances between edges in each of the first direction and the second direction, and making a decision as to grass structure detection. In such embodiments, the first direction may be horizontal and the second direction may be vertical. If short edges are close, and long edges are not, again, the material may be grass. It should be noted, however, that small sticks, pine needles and some other structures may also exhibit a large number of edges. As such, edges shorter than a predetermined length may be filtered out of the image. However, it may still be desirable to incorporate some form of color analysis to improve accuracy of a grass detector that employs structure analysis. Additionally or alternatively, the data may be converted to the frequency domain (e.g., via FFT followed by low or high pass filtering) to detect grass structures based on randomness.

In some examples, the grass detector 156 may be configured to employ the camera 154 to gather image data for comparison to other, known images. In such an example, the processing circuitry 110 (or the grass detector's own processing circuitry) may be configured to employ machine learning to consider a set of n samples of data and then try to predict properties of unknown data. In practice, the grass detector 156 may utilize a plurality of images of grass and other images that include materials other than grass to sort the images as grass or not grass to define a "vocabulary". Test images may then be compared against the vocabulary to identify whether the test images likely include grass or not. As such, for example, in some cases feature extraction may be employed to create a vocabulary of features using "K nearest neighbor". Classifiers may then be trained on a training set to check features in an image for their closes clusters in the vocabulary. A histogram of responses may then be created for each image relative to words in the vocabulary. A sample-label dataset may then be created for the training. The classifier can then provide a classification for a test image.

As mentioned above, the sensor network 90 may also include a 2.5D sensor 158. The 2.5D sensor 158 may be configured to gather data by active transmission of RF, light, or sound energy and then measuring reflected energy received. In some cases, time of flight measurements may be made to determine range (and bearing or angle) to the objects around the 2.5D sensor 158. The sensor may be referred to as 2.5D since, unlike 3D, the 2.5D sensor 158 does not obtain a full 3D picture. Instead, the 2.5D sensor 158 only obtains a slice of data at a specific height (e.g., a 2D scan of range) at the approximate height of the sensor (or at least at the height at which the sensor transmits energy). Additionally, for a true 3D scan, two sensors would be required to get the front perspective and back perspective view of objects. Also, the 3D scan would have a continuous picture developed along the height dimension, whereas the 2.5D scan has limited view of the height dimension. The perspective problem can be at least partially mooted by virtue of the fact that if the 2.5D sensor 158 is mounted on a mobile platform (which the robotic mower 10 would clearly be), then multiple perspectives can be obtained.

In some embodiments, the 2.5D sensor 158 may be embodied as a LIDAR (laser imaging detection and ranging) device or a LEDDAR (light emitting diode detection and ranging) device. LEDDAR devices may be useful in some cases, since LEDDAR devices handle lighting changes fairly well, and outdoor environments often encounter vastly different lighting conditions based on the weather.

In an example embodiment, the positioning module 60 may be configured to incorporate input from a plurality of sources (e.g., among sensor network 90 components that can generate an estimated position or cooperate to generate an estimated position) to generate a composite position based on the position information received from each of the various sources available. Thus, for example, each sensor (or at least multiple sensors) may provide separate information that can be used by the positioning module 60 to determine a corresponding position estimate. Each position estimate may also have a weight associated therewith based on time, accuracy estimates or other factors. The positioning module 60 may then calculate the composite position based on a weighted average of the individual position estimates from each respective source that has an input to provide. In some cases, predicted positions may further be determined based on current inputs, system model information and previous state information.

In some example embodiments, rather than (or in addition to) estimating a composite position, the positioning module 60 may be configured to rank or order position estimates based on a confidence score associated with each position input provided from the various sources available. The position estimate with the highest confidence score may then be selected as the current estimated position. Additionally or alternatively, the positioning module 60 may be configured to use one or more of the available sensors as a primary sensor for determining position. The positioning module 60 may also be configured to "reset" or update the primary sensor as appropriate if a more accurate position source becomes available (e.g., as in the example of resetting the IMU 150 when a more accurate position source is available).

In an example embodiment, the detection module 70 may be configured to employ sensors of the sensor network 90, including but not limited to the camera 154, and/or other information to detect objects. Object detection may occur relative to static objects that may be fixed/permanent and non-moving, but also not fixed or permanent objects. Such objects may be known (if they have been encountered before at the same position) or unknown (if the present interaction is the first interaction with the object or a first interaction with an object at the corresponding location). Object detection may also occur relative to dynamic objects that may be moving. In some cases, the dynamic objects may also be either known or unknown. Classifications of known and unknown objects may be accomplished using the detection module 70 based on whether the same object has been detected in the same location, based on machine learning relative to known images, or based on image data meeting structural parameters (e.g., edge data, FTT randomness data) indicative of grass structure. For example, the detection module 70 (or processing circuitry 110) may store images of previously encountered objects or other objects that are to be learned as known objects. When an object is encountered during operation of the robotic mower 10, if the camera 154 is able to obtain a new image of the object, the new image can be compared to the stored images to see if a match can be located. If a match is located, the new image may be classified as a known object. In some cases, a label indicating the identity of the object may be added to the map data in association with any object that is known.

In an example embodiment, the mapping module 80 may be configured to operate in a map generation (or update) mode or in a navigation mode. In the map generation mode, the mapping module 80 may be configured to incorporate input from any available input sources of the sensor network 90 in order to account for current position of the robotic mower 10 and any detected objects or boundaries in order to generate a map of the parcel 20 (or portions thereof) responsive to traversal of the parcel 20 by the robotic mower 10. As such, the mapping module 60 may receive position information from the positioning module 60 and grass detection information from the detection module 70 to generate map data that can be illustrated locally or remotely as a graphical display of a map of the parcel 20.

In some cases, the mapping module 80 may track position data (e.g., provided from the IMU 150 or another position source) and record grass detection information relative to the position of the robotic mower 10 (e.g., from the 2.5D sensor 156, the camera 95, etc.) to generate the map data. The position data may also include information indicative of terrain features (e.g., bumps, hills, edges, etc.) that are detectable by the IMU 150, if applicable. Thus, the map data may, in some cases, provide a three dimensional (or at least 2.5D as discussed above) map of the parcel 20. However, in other cases, the map may be provided in only two dimensions.

Grass may be defined on the map along with any objects detected in any suitable form. In this regard, in some cases, the map data may be converted into a model or image of the parcel 20 that can be displayed to merely show objects and/or grass in a rudimentary form, or animation, graphic overlays, icons and/or other techniques may be employed to generate a sophisticated map view that may be exported to devices with more capable displays (e.g., the electronic device 42), or that may be displayed on a display device of the robotic mower 10 itself.

Modeling may involve mapping functions that employ positioning functions and grass detection in order to generate a comprehensive map or model of the parcel 20. FIG. 5 illustrates a graphical representation of the parcel 20 generated into a map view in accordance with an example embodiment. The graphical representation of FIG. 5 is a 2D representation similar to a map view, but could easily be converted to 3D by the addition of topographical contour lines or other features (e.g., image views) to indicate features having a height dimension. The parcel 20 of FIG. 5 has the boundary 30 and charge station 40 indicated as described above. However, the parcel 20 also has a work area 291 defined along with a first exclusion area 292 and a second exclusion area 293. The first and second exclusion areas 292 and 293 may be designated by the operator as cultivated areas, or areas that are otherwise not grass and that the robotic mower 10 is to avoid. However, the work area 291 may be defined as an area that is to be mowed in its entirety. Various structures (e.g., bushes 294) are also represented, and may be appreciated by the robotic mower 10 as inaccessible areas due to the existence of a structure at the location.

The bushes 294 may be known objects. Similarly, in some cases, the first and/or second exclusion areas 292 and 293 may have borders defined by wooden, stone or other structures that may be known objects. One or more portions of the boundary 30 may also comprise known objects. However, other objects may also be encountered and/or displayed on the map. In this regard, an unknown object 295 is also shown in FIG. 5. As can easily be appreciated from FIG. 5, more detailed graphics regarding objects, boundaries and/or any other features of the parcel 20 may additionally or alternatively be provided. Moreover, in some cases, actual images may be provided with or accessible from the map view of FIG. 5.

The map view may also be useful as an operational or navigation aid in the context of scheduling. In this regard, once zones are defined the robotic mower 10 can be assigned to perform corresponding tasks in assigned zones. Thus, for example, FIG. 5 illustrates two zones (Zone A and Zone B), but it should be appreciated that many more could be defined. The robotic mower 10 may be enabled to determine its position relative to being within Zone A or Zone B. If desired, the robotic mower 10 may further be enabled to keep within Zone A or Zone B in accordance with scheduling or other programming instructions provided to the robotic mower. When provided with a schedule, the robotic mower 10 may operate in whichever zone it is scheduled to be in at a given time.

As indicated above, the robotic mower 10 may also be configured to utilize the sensor network 90 and modules described above to engage in other functions indicative of intelligent vehicle autonomy. In this regard, for example, different tasks may be defined relative to different zones or at different times. For example, Zone A be identified for mowing (or not mowing) at one specific time that may be selectable by the user, and Zone B may be identified for mowing at a different user selectable time. In some cases, the user may be enabled to see the map view on a device (e.g., the electronic device 42) and select zones, a scheduling menu, autonomous operation settings, or other interaction mechanisms to define tasks for certain zones at certain times. Instructions may be provided to mow at different times, at different heights, in specific patterns, or with selected frequency in each respective zone. Alternatively or additionally, in embodiments where a robotic vehicle other than the robotic mower 10 is employed for performing tasks on the parcel 20, the robotic vehicle can be configured to autonomously traverse the parcel 20 to check soil conditions, monitor the health of grass or other plants, direct the application of water, fertilizer, chemicals, etc., or engage in other programmed activities.

Accordingly, the robotic mower 10 (or other robotic vehicle) may be provided with the positioning module 60, the detection module 70, and the mapping module 80 to process sensor data received from the sensor network 90 including the camera 154. The robotic mower 10 may therefore be capable of accurately determining its position and gathering information about its surroundings. With accurate position determining capabilities, and the ability to experience its surroundings with multiple sensors, the robotic mower 10 may be configurable to operate without any boundary wires, and avoid bumping into objects. Additionally or alternatively, some embodiments may be employed to provide feedback, warnings, or even implement automatic functionality (e.g., stopping blade rotation and/or stopping drive power application) responsive to detection of movement outside of the bounded area. The robotic mower 10 may therefore be more capable of being programmed to perform autonomous activities of various kinds and the value proposition for owners and operators may be greatly enhanced.

Embodiments of the present invention may therefore be practiced using an apparatus such as the one depicted in FIGS. 2-3. However, it should also be appreciated that some embodiments may be practiced in connection with a computer program product for performing embodiments or aspects of the present invention. As such, for example, each block or step of the flowcharts of FIGS. 5-6, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 114) and executed by processing circuitry (e.g., processor 112).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 5-6. Moreover, other methods derived from the descriptions provided herein may also be performed responsive to execution of steps associated with such methods by a computer programmed to be transformed into a machine specifically configured to perform such methods.

In an example embodiment, a method for classifying image data according to FIG. 5 may include receiving image data and corresponding position data captured by a robotic vehicle traversing a parcel at operation 500, comparing the image data with parameters known to identify grass at operation 510, and classifying the image data as grass when the image data meets the parameters known to identify grass at operation 520. The method may also include the optional operations of generating a map of the parcel based on data received at operation 530, and enabling an operator to interact with the map to view one or more content items associated with respective positions at operation 540.

FIG. 6 illustrates a control flow diagram of one example of how the robotic mower 10 can be operated to detect grass on a parcel 20 in accordance with an example embodiment. As shown in FIG. 6, operation may begin with receiving image data and corresponding position data captured by a robotic vehicle traversing a parcel at operation 600. The operation may continue with measuring at least one of vertical or horizontal edges in the image data at operation 610. The operation may continue at operation 620 by making a decision as to whether the edges are shorter than a predetermined length known to identify grass. If the decision is made that the edges are shorter than a predetermined length known to identify grass, then the image data is classified as grass at operation 630a. If the decision is made that the edges are longer than a predetermined length known to identify grass, then the image data is classified as not being grass at operation 630b.

As such, in some cases, the robotic mower 10 may generally operate in accordance with a control method that combines the modules described above to provide a functionally robust robotic vehicle. In this regard, a method according to example embodiments of the invention may include any or all of the operations shown in FIG. 6. Moreover, other methods derived from the descriptions provided herein may also be performed responsive to execution of steps associated with such methods by a computer programmed to be transformed into a machine specifically configured to perform such methods.

Some example embodiments may also or alternatively provide a robotic vehicle that is configured to incorporate multiple sensors to make the robotic vehicle capable of classifying objects by comparing images of encountered objects with images of known objects stored in image libraries. In this regard, in some cases, the robotic vehicle may include an onboard positioning module, a detection module, and an classification module that may work together to give the robotic vehicle a comprehensive understanding of its current location and of the features or objects located in its environment. Moreover, the robotic vehicle may include sensors that enable the modules to collect and process data that can be used to classify objects on a parcel on which the robotic vehicle operates.

In an example embodiment, a robotic vehicle (e.g., a robotic mower, a mobile sensing device, a watering device and/or the like) is provided with a positioning module, detection module, classification module, and a sensor network. The positioning module may be configured to utilize one or more sensors to determine a location of the robotic vehicle and direct continued motion of the robotic vehicle. The detection module may be configured to utilize one or more sensors to detect objects and/or boundaries that are located in the area around the robotic mower to enable the robotic mower to identify the objects or boundaries without physically contacting them. The classification module may be configured to utilize one or more sensors to compare images of objects located in the area around the robotic mower with known object images in an image library. The sensor network may be configured to collect data (e.g., image data). Other structures may also be provided, and other functions may also be performed as described in greater detail below.

FIG. 8 illustrates an example operating environment for a robotic mower 1010 that may be employed in connection with an example embodiment. However, it should be appreciated that example embodiments may be employed on numerous other robotic vehicles, so the robotic mower 1010 should be recognized as merely one example of such a vehicle. The robotic mower 1010 may operate to cut grass on a parcel 1020 (i.e., a land lot or garden), the boundary 1030 of which may be defined using one or more physical boundaries (e.g., a fence, wall, curb and/or the like), a boundary wire, programmed location based boundaries or combinations thereof. When the boundary 1030 is a boundary wire, the boundary wire may emit electrical signals that are detectable by the robotic mower 1010 to inform the robotic mower 1010 when the boundary 1030 of the parcel 1020 has been reached. Other robotic vehicles (e.g., a robotic watering vehicle) may operate in similarly defined areas, but an example embodiment will be described herein in connection with a robotic mower. However, it should be appreciated that example embodiments are not limited to application only on robotic mowers. Instead, example embodiments may also be practiced in connection with other robotic vehicles that operate within bounded regions.

The robotic mower 1010 may be controlled, at least in part, via control circuitry 1012 located onboard. The control circuitry 1012 may include, among other things, a positioning module, a detection module, a classification module, and a sensor network, which will be described in greater detail below. Accordingly, the robotic mower 1010 may utilize the control circuitry 1012 to define a path for coverage of the parcel 1020 in terms of performing a task over specified portions or the entire parcel 1020. In this regard, the positioning module may be used to guide the robotic mower 1010 over the parcel 1020 and to ensure that full coverage (of at least predetermined portions of the parcel 1020) is obtained, the detection module may be used to detect objects and/or boundaries that are located in the area around the robotic mower 1010 to enable the robotic mower 1010 to identify the objects or boundaries 1030 without physically contacting them, the classification module may be used to classify objects detected around the robotic mower 1010 on the parcel 1020, while the sensor network may gather data regarding the surroundings of the robotic mower 1010 while the parcel 1020 is traversed.

If a sensor network is employed, the sensor network may include sensors related to positional determination (e.g., a GPS receiver, an accelerometer, a camera, an ultrasonic sensor, a laser scanner and/or the like). Thus, for example, positional determinations may be made using GPS, inertial navigation, optical flow, visual location (e.g., VSLAM) and/or other positioning techniques or combinations thereof. Accordingly, the sensors may be used, at least in part, for determining the location of the robotic mower 1010 relative to boundaries or other points of interest (e.g., a starting point or other key features) of the parcel 1020, or determining a position history or track of the robotic mower 1010 over time. The sensors may also detect collision, tipping over, or various fault conditions. In some cases, the sensors may also or alternatively collect data regarding various measurable parameters (e.g., moisture, temperature, soil conditions, etc.) associated with particular locations on the parcel 1020.

In an example embodiment, the robotic mower 1010 may be battery powered via one or more rechargeable batteries. Accordingly, the robotic mower 1010 may be configured to return to a charge station 1040 that may be located at some position on the parcel 1020 in order to recharge the batteries. The batteries may power a drive system and a blade control system of the robotic mower 1010. However, the control circuitry 1012 of the robotic mower 1010 may selectively control the application of power or other control signals to the drive system and/or the blade control system to direct the operation of the drive system and/or blade control system. Accordingly, movement of the robotic mower 1010 over the parcel 1020 may be controlled by the control circuitry 1012 in a manner that enables the robotic mower 1010 to systematically traverse the parcel while operating a cutting blade to cut the grass on the parcel 1020. In cases where the robotic vehicle is not a mower, the control circuitry 1012 may be configured to control another functional or working assembly that may replace the blade control system and blades.

In some embodiments, the control circuitry 1012 and/or a communication node at the charge station 1040 may be configured to communicate wirelessly with an electronic device 1042 (e.g., a personal computer, a cloud based computer, server, mobile telephone, PDA, tablet, smart phone, and/or the like) of a remote operator 1044 (or user) via wireless links 1046 associated with a wireless communication network 1048. The wireless communication network 1048 may provide operable coupling between the remote operator 1044 and the robotic mower 1010 via the electronic device 1042, which may act as a remote control device for the robotic mower 1010. However, it should be appreciated that the wireless communication network 1048 may include additional or internal components that facilitate the communication links and protocols employed. Thus, some portions of the wireless communication network 1048 may employ additional components and connections that may be wired and/or wireless. For example, the charge station 1040 may have a wired connection to a computer or server that is connected to the wireless communication network 1048, which may then wirelessly connect to the electronic device 1042. As another example, the robotic mower 1010 may wirelessly connect to the wireless communication network 1048 (directly or indirectly) and a wired connection may be established between one or more servers of the wireless communication network 1048 and a PC of the remote operator 1044. In some embodiments, the wireless communication network 1048 may be a data network, such as a local area network (LAN), a metropolitan area network (MAN), a wide area network (WAN) (e.g., the Internet), and/or the like, which may couple the robotic mower 1010 to devices such as processing elements (e.g., personal computers, server computers or the like) or databases. Accordingly, communication between the wireless communication network 1048 and the devices or databases (e.g., servers, electronic device 1042, control circuitry 1012) may be accomplished by either wireline or wireless communication mechanisms and corresponding protocols.

FIG. 9 illustrates a block diagram of various components that may be employed to facilitate classification of image data in accordance with an example embodiment. As can be seen from FIG. 9, the wireless communication network 1048 (e.g., the internet) may be capable of providing communication between the electronic device 1042 and the robotic mower 1010. When communication is established between the wireless communication network 1048 and the robotic mower 1010, the communication may be established using any suitable wireless communication mechanism such as, for example, second-generation (2G) wireless communication protocols IS-136 (TDMA), GSM, and IS-95 (CDMA), third-generation (3G) wireless communication protocols, such as UMTS, CDMA2000, WCDMA and TD-SCDMA, LTE or E-UTRAN, fourth-generation (4G) wireless communication protocols or the like. However, in some cases, a wireless access point 1100 may be provided in association with the parcel 1020 to serve the robotic mower 1010. The wireless access point 1100 may have a wired or wireless connection to the wireless communication network 1048, and may then employ a short range communication protocol (e.g., WiFi, Bluetooth, or the like) to communicate with the robotic mower 1010.

Regardless of the particular communication mechanism employed, it should be appreciated that user interaction between the electronic device 1042 and the robotic mower 1010 is facilitated by example embodiments. In some cases, information regarding the robotic mower 1010, the parcel 1020, the remote operator 1044, account details associated with any of the foregoing, and/or the like, may be stored "in the cloud." For example, a server 1120 may be provided as part of, or in communication with, the wireless communication network 1048. The server 1120 may include memory and/or processing components to store data and execute functionality associated with the employment of example embodiments. Thus, for example, instructions for operation of the robotic mower 1010, data (e.g., image data, position data and/or the like) to be collected, registered users or devices, and/or other information may be stored at the server 1120.

In some cases, the manufacturer may provide an identifier, vehicle identification number, or other such identifying information regarding each robotic vehicle produced to the server 1120 (or an instance thereof). The identification information may uniquely identify each instance of robotic vehicle and enable each respective robotic vehicle to be registered to a user, organization, parcel and/or user account. The server 1120 may therefore store account information and correlate various account settings, programs, instructions, applications and/or the like, with the account generally or in association with all or particular ones of the robotic vehicles registered to the account. In some examples, actions of the server 1120 may be controlled, managed, or coordinated by a controlling device (e.g., object classifier 1350). The server 1120 may interact with the electronic device 1042 and/or the robotic mower 1010 (or other robotic vehicles) individually in sequence or simultaneously in order to update, modify, execute or otherwise perform functions associated with the accounts and vehicles associated with the accounts.

In some embodiments, in addition or as an alternative to the mobile electronic device 1110, the electronic device 1042 could be embodied as a fixed electronic device 1130 (e.g., a PC, computer terminal and/or the like). Thus, the remote operator 1044 could be enabled to control the robotic mower 1010 via the fixed electronic device 1130 or via the mobile electronic device 1110 (e.g., a smart phone, tablet, laptop, etc.). In some cases, the user 1044 may be enabled to log into an account associated with the user 1044 (or with the parcel 1020, an organization responsible for the parcel 1020, and/or the like) to manage tasks or data associated with the robotic mower 1010 or with other robotic vehicles that may be associated with the account. In any case, a communication controller 1140 may be embodied at the device from which instructions or other data/information associated with controlling the operation of the robotic mower 1010 (or other robotic vehicles) associated with the account. The communication controller 1140 may be used for interface on any electronic device 1042 from which users access the Internet. Accordingly, for example, an instance of the communication controller 1140 may be embodied at any (or each) device that is capable of remotely interacting with the robotic mower 1010 (or other robotic vehicles).

Some examples of the interactions that may be enabled by example embodiments will be described herein by way of explanation and not of limitation. FIG. 10 illustrates a block diagram of various components of the control circuitry 1012 to illustrate some of the components that enable the functional performance of the robotic mower 1010 and to facilitate description of an example embodiment. In some example embodiments, the control circuitry 1012 may include or otherwise be in communication with a positioning module 1060, a detection module 1070, and a classification module 1080. As mentioned above, the positioning module 1060, the detection module 1070, and the classification module 1080 may work together to give the robotic mower 1010 a comprehensive understanding of its environment, and enable it to classify objects that it encounters on the parcel 1020.

Any or all of the positioning module 1060, the detection module 1070, and the classification module 1080 may be part of a sensor network 1090 of the robotic mower 1010. However, in some cases, any or all of the positioning module 1060, the detection module 1070, and the classification module 1080 may be in communication with the sensor network 90 to facilitate operation of each respective module.

In some examples, one or more of the positioning module 1060, the detection module 1070, and the classification module 1080 may further include or be in communication with a camera 1254 other imaging device. The camera 1254 may be a part of the sensor network 1090, part of any of the modules described above, or may be in communication with one or more of the modules to enhance, enable or otherwise facilitate operation of respective ones of the modules. The camera 1254 may include an electronic image sensor configured to store captured image data (e.g., in memory 1114). Image data recorded by the camera 1254 may be in the visible light spectrum or in other portions of the electromagnetic spectrum (e.g., IR camera). In some cases, the camera 1254 may actually include multiple sensors configured to capture data in different types of images (e.g., RGB, IR, and grayscale sensors). The camera 1254 may be configured to capture still images and/or video data.

The robotic mower 1010 may also include one or more functional components 1200 that may be controlled by the control circuitry 1012 or otherwise be operated in connection with the operation of the robotic mower 1010. The functional components 1200 may include a wheel assembly (or other mobility assembly components), one or more cutting blades and corresponding blade control components, and/or other such devices. In embodiments where the robotic vehicle is not a mower, the functional components 1200 may include equipment for taking soil samples, operating valves, distributing water, seed, powder, pellets or chemicals, and/or other functional devices and/or components.

The control circuitry 1012 may include processing circuitry 1110 that may be configured to perform data processing or control function execution and/or other processing and management services according to an example embodiment of the present invention. In some embodiments, the processing circuitry 1110 may be embodied as a chip or chip set. In other words, the processing circuitry 1110 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 1110 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 1110 may include one or more instances of a processor 1112 and memory 1114 that may be in communication with or otherwise control a device interface 1120 and, in some cases, a user interface 1130. As such, the processing circuitry 1110 may be embodied as a circuit chip (e.g., an integrated circuit chip) configured (e.g., with hardware, software or a combination of hardware and software) to perform operations described herein. However, in some embodiments, the processing circuitry 1110 may be embodied as a portion of an on-board computer. In some embodiments, the processing circuitry 1110 may communicate with electronic components and/or sensors of the robotic mower 1010 via a single data bus. As such, the data bus may connect to a plurality or all of the switching components, sensory components and/or other electrically controlled components of the robotic mower 1010.

The processor 1112 may be embodied in a number of different ways. For example, the processor 1112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 1112 may be configured to execute instructions stored in the memory 1114 or otherwise accessible to the processor 1112. As such, whether configured by hardware or by a combination of hardware and software, the processor 1112 may represent an entity (e.g., physically embodied in circuitry in the form of processing circuitry 1110) capable of performing operations according to embodiments of the present invention while configured accordingly. Thus, for example, when the processor 1112 is embodied as an ASIC, FPGA or the like, the processor 1112 may be specifically configured hardware for conducting the operations described herein. Alternatively, as another example, when the processor 1112 is embodied as an executor of software instructions, the instructions may specifically configure the processor 1112 to perform the operations described herein.

In an example embodiment, the processor 1112 (or the processing circuitry 1110) may be embodied as, include or otherwise control the positioning module 1060, the detection module 1070, the classification module 1080, the sensor network 1090, and/or other functional components 1200 of or associated with the robotic mower 1010. As such, in some embodiments, the processor 1112 (or the processing circuitry 1110) may be said to cause each of the operations described in connection with the positioning module 1060, the detection module 1070, the classification module 1080, the sensor network 1090, and/or other functional components 1200 by directing the positioning module 1160, the detection module 1170, the classification module 1180, the sensor network 1090, and/or other functional components 1200, respectively, to undertake the corresponding functionalities responsive to execution of instructions or algorithms configuring the processor 1112 (or processing circuitry 1110) accordingly. These instructions or algorithms may configure the processing circuitry 1110, and thereby also the robotic mower 1010, into a tool for driving the corresponding physical components for performing corresponding functions in the physical world in accordance with the instructions provided.

In an exemplary embodiment, the memory 1114 may include one or more non-transitory memory devices such as, for example, volatile and/or non-volatile memory that may be either fixed or removable. The memory 1114 may be configured to store information, data, applications, instructions or the like for enabling the positioning module 1060, the detection module 7100, the classification module 1080, the sensor network 1090, and/or other functional components 1200 to carry out various functions in accordance with exemplary embodiments of the present invention. For example, the memory 1114 could be configured to buffer input data for processing by the processor 1112. Additionally or alternatively, the memory 1114 could be configured to store instructions for execution by the processor 1112. As yet another alternative, the memory 1114 may include one or more databases that may store a variety of data sets responsive to input from various sensors or components of the robotic mower 1010. Among the contents of the memory 1114, applications may be stored for execution by the processor 1112 in order to carry out the functionality associated with each respective application.

The applications may include applications for controlling the robotic mower 1010 relative to various operations including determining an accurate position of the robotic mower 1010 (e.g., using one or more sensors of the positioning module 1060). Alternatively or additionally, the applications may include applications for controlling the robotic mower 1010 relative to various operations including determining the existence and/or position of obstacles (e.g., static or dynamic) and borders relative to which the robotic mower 1010 must navigate (e.g., using one or more sensors of the detection module 1070). Alternatively or additionally, the applications may include applications for controlling the robotic mower 1010 relative to various operations including comparing images of objects encountered on a parcel with images of known objects (e.g., grass, gravel, pavement, trees, flowers, etc.) from an image library (e.g., using one or more sensors of the classification module 1080). Alternatively or additionally, the applications may include applications for controlling the camera 1254 and/or processing image data gathered by the camera 1254 to execute or facilitate execution of other applications that drive or enhance operation of the robotic mower 10 relative to various activities described herein.

In some cases, information associated with the positioning module 1060, detection module 1070, classification module 1080, and/or the sensor network 1090 may be extracted from the robotic mower 1010 and mated with a remote network terminal or computer. The information stored on the memory 1114 may then be extracted and thereby reported for fleet management or other applications. In other cases, the device interface 1120 may be configured to wirelessly transmit information associated with the positioning module 1060, detection module 1070, classification module 1080, and/or the sensor network 1090 to a remote computer to enable data processing to be accomplished on the remote computer. For example, in some cases, Bluetooth, WiFi or other wireless communication modules may be provided by the device interface 1120 in order to allow wireless downloading of software, support information or other data, or allow wireless uploading of data to network devices for support, management or other purposes. In some embodiments, Bluetooth, WiFi or other short range wireless communication modules may be used to communicate data to an intermediate device (e.g., a cell phone), which may then communicate the data to a computer or other device at which certain analysis and/or display may be performed. In still other cases, a removable memory device may be used to transfer information from the memory 1114 to the removable memory device and thereafter to the remote computer. Thus, in some embodiments, image data and/or position data may be communicated to an external computer and may be manipulated thereat, or may be correlated to other image and/or position information (e.g., previously collected image data from a corresponding position).

The user interface 1130 (if implemented) may be in communication with the processing circuitry 1110 to receive an indication of a user input at the user interface 1130 and/or to provide an audible, visual, mechanical or other output to the user. As such, the user interface 1130 may include, for example, a display, one or more buttons or keys (e.g., function buttons), and/or other input/output mechanisms (e.g., microphone, speakers, cursor, joystick, lights and/or the like).

The device interface 1120 may include one or more interface mechanisms for enabling communication with other devices either locally or remotely. In some cases, the device interface 1120 may be any means such as a device or circuitry embodied in either hardware, or a combination of hardware and software that is configured to receive and/or transmit data from/to sensors or other components in communication with the processing circuitry 1110. In some example embodiments, the device interface 1120 may provide interfaces for communication of data to/from the control circuitry 1012, the positioning module 1060, the detection module 1070, the classification module 1080, the sensor network 1090, the camera 1254 and/or other functional components 1200 via wired or wireless communication interfaces in a real-time manner, as a data package downloaded after data gathering or in one or more burst transmission of any kind.

Each of the positioning module 1060, the detection module 1070, and the classification module 1080 may be any means such as a device or circuitry embodied in either hardware, or a combination of hardware and software that is configured to perform the corresponding functions described herein. Thus, the modules may include hardware and/or instructions for execution on hardware (e.g., embedded processing circuitry) that is part of the control circuitry 1012 of the robotic mower 1010. The modules may share some parts of the hardware and/or instructions that form each module, or they may be distinctly formed. As such, the modules and components thereof are not necessarily intended to be mutually exclusive relative to each other from a compositional perspective.

The positioning module 1060 may be configured to utilize one or more sensors (e.g., of the sensor network 1090) to determine a location of the robotic mower 1010 and direct continued motion of the robotic mower 1010 to achieve appropriate coverage of the parcel 1020. As such, the robotic mower 1010 (or more specifically, the control circuitry 1012) may use the location information to determine a mower track and/or provide full coverage of the parcel 1020 to ensure the entire parcel is mowed (or otherwise serviced). The positioning module 1060 may therefore be configured to direct movement of the robotic mower 1010, including the speed and direction of the robotic mower 1010. The positioning module 1060 may also employ such sensors to attempt to determine an accurate current location of the robotic mower 1010 on the parcel 1020 (or generally).

Various sensors of sensor network 1090 of the robotic mower 1010 may be included as a portion of, or otherwise communicate with, the positioning module 1060 to, for example, determine vehicle speed/direction, vehicle location, vehicle orientation and/or the like. Sensors may also be used to determine motor run time, machine work time, and other operational parameters. In some embodiments, positioning and/or orientation sensors (e.g., global positioning system (GPS) receiver and/or accelerometer) may be included to monitor, display and/or record data regarding vehicle position and/or orientation as part of the positioning module 1060.

In an example embodiment, the detection module 1070 may be configured to utilize one or more sensors (e.g., of the sensor network 1090) to detect objects and/or boundaries that are located in the area around the robotic mower 1010 to enable the robotic mower 1010 to identify the objects or boundaries without physically contacting them. Thus, the detection module 1070 may enable object avoidance as well as allow the robotic mower 1010 to avoid contact with boundaries, buildings, fences, and/or the like while covering the parcel 1020. As such, the robotic mower 1010 (or more specifically, the control circuitry 1012) may object/boundary detection information to alter a mower track and/or report impediments to providing full coverage of the parcel 1020. The detection module 1070 may therefore be configured to detect static (i.e., fixed or permanent) and/or dynamic (i.e., temporary or moving) objects in the vicinity of the robotic mower 1010. Moreover, in some cases, the detection module 1070 may interact with the positioning module 1060 to utilize one or more objects to facilitate positioning or boundary definition for the robotic mower 1010.

Various sensors of sensor network 1090 of the robotic mower 1010 may be included as a portion of, or otherwise communicate with, the detection module 1070 to, for example, determine the existence of objects, determine range to objects, determine direction to objects, classify objects, and/or the like.

In an example embodiment, the classification module 1080 may be configured to utilize one or more sensors (e.g., of the sensor network 1090) to classify objects detected around the robotic mower 1010 on the parcel 1020. Thus, the classification module 1080 may include components that enable the robotic vehicle 1010 to compare images of objects with images of known objects (e.g., grass, gravel, pavement, trees, flowers, etc.) from an image library in order to classify the objects on the parcel 1020. Accordingly, the classification module 1080 may enable the robotic mower 1010 to compare and classify objects based on grayscale digital images of the objects that the robotic mower 1010 encounters while traversing the parcel 1020. Alternatively or in addition, the classification module 1080 may enable the robotic mower 1010 to compare and classify objects based on edge data as will be described in more detail below. Thus, for example, the classification module 1080 may enable data gathered to be used to classify objects that the robotic mower 1010 encounters while traversing the parcel 1020 by comparing images of the encountered objects with images of known objects (e.g., grass, gravel, pavement, trees, flowers, etc.) stored in an image library.

Various sensors of sensor network 1090 of the robotic mower 1010 may be included as a portion of, or otherwise communicate with, the object classification module 1080 to, for example, build an image library of the various objects encountered by the robotic mower 1010 on the parcel 1020 so that the image library can be used for comparison and classification of objects by the robotic mower 1010.

In an example embodiment, as mentioned above, the communication controller 1140 may interface with the control circuitry 1012 of the robotic mower 1010. The remote interaction may also be used for data gathering, data aggregation, task performance and/or the like. FIG. 11 illustrates a block diagram of the communication controller 1140 of an example embodiment.

As shown in FIG. 11, the communication controller 1140 may include processing circuitry 1310 that may be configured to perform data processing, control function execution and/or other processing and management services according to an example embodiment of the present invention. In some embodiments, the processing circuitry 1310 may be embodied as a chip or chip set. In other words, the processing circuitry 1310 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 1310 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 1310 may include one or more instances of a processor 1312 and memory 1314 that may be in communication with or otherwise control a device interface 1320 and, in some cases, a user interface 1330. As such, the processing circuitry 1310 may be embodied as a circuit chip (e.g., an integrated circuit chip) configured (e.g., with hardware, software or a combination of hardware and software) to perform operations described herein. However, in some embodiments, the processing circuitry 1310 may be embodied as a portion of a programmable computer.

The processor 1312 may be embodied in a number of different ways. For example, the processor 1312 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 1312 may be configured to execute instructions stored in the memory 1314 or otherwise accessible to the processor 1312. As such, whether configured by hardware or by a combination of hardware and software, the processor 1312 may represent an entity (e.g., physically embodied in circuitry in the form of processing circuitry 1310) capable of performing operations according to embodiments of the present invention while configured accordingly. Thus, for example, when the processor 1312 is embodied as an ASIC, FPGA or the like, the processor 1312 may be specifically configured hardware for conducting the operations described herein. Alternatively, as another example, when the processor 1312 is embodied as an executor of software instructions, the instructions may specifically configure the processor 1312 to perform the operations described herein.

In an example embodiment, the processor 1312 (or the processing circuitry 1310) may be configured to generate control consoles, user interface icons, control menus, option selections, input boxes, display-based interaction mechanisms, and/or the like by which the user 1044 may be enabled to provide instructions or other inputs for interaction with the server 1120 and/or the robotic mower 1010. As such, in some embodiments, the processor 1312 (or the processing circuitry 1310) may be said to cause each of the operations described in connection with the communication controller 1140 by directing the communication controller 1140 to undertake the corresponding functionalities responsive to execution of instructions or algorithms configuring the processor 1312 (or processing circuitry 1310) accordingly. These instructions or algorithms may configure the processing circuitry 1310, and thereby also transform the communication controller 1140, into a tool for performing corresponding functions in the physical world in accordance with the instructions provided such as, for example, providing interface mechanisms for controlling the operation of the robotic mower 1010 relative to mowing, gathering data, reporting data gathered or other activity, and/or the like, for controlling the pairing of the robotic mower 1010 with the electronic device, and/or for updating or modifying programs or applications that relate to settings or other activities of the accounts and devices associated with accounts that the user 1044 of the electronic device 1042 is authorized to access.

In an exemplary embodiment, the memory 1314 may include one or more non-transitory memory devices such as, for example, volatile and/or non-volatile memory that may be either fixed or removable. The memory 1314 may be configured to store information, data, applications, instructions or the like for enabling the communication controller 1140 to carry out various functions in accordance with exemplary embodiments of the present invention. For example, the memory 1314 could be configured to buffer input data for processing by the processor 1312. Additionally or alternatively, the memory 1314 could be configured to store instructions for execution by the processor 1312. Among the contents of the memory 1314, applications may be stored for execution by the processor 1312 in order to carry out the functionality associated with each respective application. In some cases, the applications may include an application for providing the interface consoles, screens, prompts and/or the like to enable the user 1044 to interface with the robotic mower 1010 or interface with an account associated with the robotic mower 1010, the parcel 1020 or an organization associated with the robotic mower 1010, the user 1044, or the parcel 1020.

The user interface 1330 may be in communication with the processing circuitry 1310 to receive an indication of a user input at the user interface 1330 and/or to provide an audible, visual, mechanical or other output to the user 1044. As such, the user interface 1330 may include, for example, a display, one or more buttons or keys (e.g., function buttons, keyboard, etc.), and/or other input/output mechanisms (e.g., microphone, speakers, cursor, joystick, lights and/or the like).

The device interface 1320 may include one or more interface mechanisms for enabling communication with other devices either locally or remotely (e.g., the remote mower 1010 or the other remote vehicles). In some cases, the device interface 1320 may be any means such as a device or circuitry embodied in either hardware, or a combination of hardware and software that is configured to receive and/or transmit information or data from/to devices or other components in communication with the processing circuitry 1310. In some example embodiments, the device interface 1320 may provide interfaces for communication of data to and/or from the remote mower 1010 or the other remote vehicles via wired or wireless communication interfaces in a real-time manner. Interfaces for directing remote control of such vehicles may be provided as a data package downloaded from the server 1120 in one or more burst transmissions of any kind.

In some embodiments, the server 1120 may include the object classifier 1350, which may be embodied as or otherwise include processing circuitry 1360. The processing circuitry 1360 may include a processor 1362 and memory 1364 as shown in FIG. 12. The processing circuitry 1360 may also include a device interface 1370. The processor 1362, memory 1364 and device interface 1370 may be similar in function (and in some cases also form) to the processor 1312, memory 1314 and device interface 1320 described above. Thus, specific descriptions of these components will not be repeated.

The object classifier 1350 may be embodied as any device or means embodied in either hardware, software, or a combination of hardware and software configured to provide the interfaces and executable instructions for modeling data associated with the robotic mower 1010 (or other robotic vehicles) or the parcel 1020. Thus, for example, the object classifier 1350 may, in some cases, include an application having stored instructions that when executed by hardware (i.e., the processing circuitry 1360), cause the processing circuitry 1360 to be transformed into a tool for uploading data (e.g., image data, position data, etc.). As such, the object classifier 1350 may control storage and management of data (e.g., image data, position data, etc.), error notification, connectivity, analytics, fleet management, and remote control functions. Modeled data may be maintained at the server 1120. Additionally, a listing of all distributed assets (i.e., robotic vehicles) may also be stored at the server 1120. More information about some of these services is provided herein.

In an example embodiment, the processor 1362 (or the processing circuitry 1360) may be said to cause each of the operations described in connection with the object classifier 1350 by directing the object classifier 1350 to undertake the corresponding functionalities responsive to execution of instructions or algorithms configuring the processor 1362 (or processing circuitry 1360) accordingly. These instructions or algorithms may configure the processing circuitry 1360, and thereby also transform the object classifier 1350, into a tool for performing corresponding functions in the physical world in accordance with the instructions provided such as, for example, directing the operation of the robotic mower 1010 relative to mowing, gathering data, reporting data gathered or other activity, and/or the like, receiving instructions from a user 1044 at the electronic device 1042, and/or the like.

In an exemplary embodiment, the memory 1364 may be configured to store information, data, applications, instructions or the like for enabling the object classifier 1350 to carry out various functions in accordance with exemplary embodiments of the present invention. For example, the memory 1364 could be configured to buffer input data for processing by the processor 1362. Additionally or alternatively, the memory 1364 could be configured to store instructions for execution by the processor 1362. As yet another alternative, the memory 1364 may include one or more databases that may store a variety of data sets responsive to input from various sensors or components of the robotic mower 1010. Among the contents of the memory 1364, applications may be stored for execution by the processor 1362 in order to carry out the functionality associated with each respective application. In some cases, the applications may include an application for storing and manipulating collected data; facilitating setting up of communication links between paired devices; storing information such as routes, programs, task lists and/or the like. Additionally or alternatively, for example, the applications may include one or more algorithms for directing operation of the robotic mower 1010 for capturing data, mowing, performing other actions, and/or the like. In some cases, one or more applications may be provided for data aggregation, notifications, adjusting settings, fleet management and/or the like as described herein.

As can be appreciated from the descriptions above, in some cases, the programmatic control may include programming the robotic mower 1010 to respond to certain situations detected at the robotic mower 1010. Thus, certain conditions detected (e.g., via the sensor network 1090) may trigger corresponding responses and the conditions and/or responses may be programmed using the object classifier 1350. In some cases, the sensor network 1090 may detect when the robotic mower 1010 is removed from the parcel 1020. In such cases, a local alarm at the robotic mower 1010 may be triggered. Additionally or alternatively, a notification may be sent from the robotic mower 1010 to the server 1120 and/or the electronic device 1042 to alert the user 1044 of the removal from the parcel 1020 (e.g., via email, MMS or other alerting mechanisms). Additionally or alternatively, a notification may be sent from the robotic mower 1010 to the server 1120 and/or the electronic device 1042 to alert the user 1044 if the robotic mower 1010 requires operator input for object classification. In other cases, the robotic mower 1010 may be programmed to avoid operation during certain detectable weather conditions (or when such conditions are reported via internet connection), or avoid operation when other yard maintenance equipment is operating (e.g., when an irrigation system is operating).

In some embodiments, position and status updates may routinely, continuously, or periodically be provided to the server 1120 and/or the electronic device 1042. If provided to the server 1120, the user 1044 may be enabled to monitor such status information when logged in at the electronic device 1042. However, the object classifier 1350 may enable the user 1044 to define specific events or triggers that will cause the server 1120 to notify the user 1044 upon any such occurrences being reported to the server 1120. Error or fault conditions may also result in notifications being provided from the robotic mower 1010 to the server 1120 and/or the electronic device 1042. Other conditions, such as service related conditions, may be monitored at the server 1120 and the user 1044 may be notified when corresponding service conditions warrant attention. Data for troubleshooting or other analytics may also be provided from the robotic mower 1010 to the server 1120 and/or the electronic device 1042. Thus, the object classifier 1350 may further provide a mechanism by which to troubleshoot various device performance issues.

In an example embodiment, the sensor network 1090 may provide data to the modules described above to facilitate execution of the functions described above, and/or any other functions that the modules may be configurable to perform. In some cases, the sensor network 1090 may include (perhaps among other things) any or all of inertial measurement unit (IMU) 1250, a GPS receiver 1252, a camera 1254, an object detector 1256, and a 2.5D sensor 1258, as shown in FIG. 13. In this regard, FIG. 13 illustrates a block diagram of some components that may be employed as part of the sensor network 1090 in accordance with an example embodiment.

The sensor network 1090 may include independent devices with on-board processing that communicate with the processing circuitry 1110 of the control circuitry 1012 via a single data bus, or via individual communication ports. However, in some cases, one or more of the devices of the sensor network 1090 may rely on the processing power of the processing circuitry 1110 of the control circuitry 1012 for the performance of their respective functions. As such, in some cases, one or more of the sensors of the sensor network 1090 (or portions thereof) may be embodied as portions of the object classifier module 1080, the detection module 1070, and/or the positioning module 1060, and any or all of such sensors may employ the camera 1254.

The IMU 1250 may include one or more and any or all of combinations of accelerometers, odometers, gyroscopes, magnetometers, compasses, and/or the like. As such, the IMU 1250 may be configured to determine velocity, direction, orientation and/or the like so that dead reckoning and/or other inertial navigation determinations can be made by the control circuitry 1012. The IMU 1250 may be enabled to determine changes in pitch, roll and yaw to further facilitate determining terrain features and/or the like.

Inertial navigation systems may suffer from integration drift over time. Accordingly, inertial navigation systems may require a periodic position correction, which may be accomplished by getting a position fix from another more accurate method or by fixing a position of the robotic mower 1010 relative to a known location. For example, navigation conducted via the IMU 1250 may be used for robotic mower 1010 operation for a period of time, and then a correction may be inserted when a GPS fix is obtained on robotic mower position. As an example alternative, the IMU 1250 determined position may be updated every time the robotic mower 1010 returns to the charge station 1040 (which may be assumed to be at a fixed location). In still other examples, known reference points may be disposed at one or more locations on the parcel 1020 and the robotic mower 1010 may get a fix relative to any of such known reference points when the opportunity presents itself. The IMU 1250 determined position may then be updated with the more accurate fix information.

In some embodiments, the GPS receiver 1252 may be embodied as a real time kinematic (RTK)—GPS receiver. As such, the GPS receiver 1252 may employ satellite based positioning in conjunction with GPS, GLONASS, Galileo, GNSS, and/or the like to enhance accuracy of the GPS receiver 1252. In some cases, carrier-phase enhancement may be employed such that, for example, in addition to the information content of signals received, the phase of the carrier wave may be examined to provide real-time corrections that can enhance accuracy.

In an example embodiment, the robotic mower 1010 is provided with a camera 1254 in addition to any other sensors or functional components 1200 that the robotic mower 1010 may carry. The camera 1254, and perhaps also other sensor equipment, may be configured to gather image data and other information during operation of the robotic mower 1010 on the lawn (i.e., on the parcel 1020). The image data may be of known objects (e.g., grass, gravel, pavement, trees, flowers, etc.) to update an image library. Alternatively or in addition, the image data may be of new objects encountered by the robotic mower 1010 to be compared with the images of known objects (e.g., grass, gravel, pavement, trees, flowers, etc.) stored in the image library.

The object detector 1256 may be configured to detect objects using any of a variety of different detection methods related to the particular features that the object detector 1256 is configured to perceive. In this regard, the object detector 1256 may be configured to detect objects based on structural and configured components that are able to perceive specific colors and/or structures that may be used to indicate objects on the parcel 1020.

As mentioned above, in some cases, the object detector 1256 may be configured to identify objects based on passively receiving image data and analyzing the image data for grayscale digital images that distinguish a given object from other objects. In some cases, the camera 1254 may be used to capture image data. The image data may include grayscale pixel intensity values for various pixels in each image. The grayscale pixel intensity values may be for an object may be compared to known pixel intensity values for objects stored in the image library. In some cases, the camera 1254 may also capture IR information and both grayscale pixel intensity values and IR values can be analyzed for color based object detection.

In some cases, as an alternative to (or in addition to) using color, structure (and/or elevation) may be used to facilitate detection and classification of objects. As such, classification of objects may be performed using feature extraction. Thus, instead of comparing a whole image, specific features can be extracted from images and compared. For example, edge data is one such feature. In this regard, when analyzed in an image, the structure of different objects will display various degrees of randomness. Thus, for example, an edge detection algorithm could be employed to identify edges in images (e.g., via filtering), and then for each edge-pixel, calculate the distance to other edges nearby. For example, if the edge distance calculation is small, then there are a lot of edges and the material being analyzed may be grass. For example, if the edge distance calculation is large, then the material is likely not grass. In some embodiments, it may be possible to measure edges distinctly in vertical and horizontal directions (or at least in orthogonally different directions). If short edges are close, for example, and long edges are not, again, the material may be grass. It should be noted, however, that small sticks, pine needles and some other structures may also exhibit a large number of edges. Accordingly, it may still be desirable to incorporate some form of color analysis to improve accuracy of an object detector that employs structure analysis. Additionally or alternatively, the data may be converted to the frequency domain (e.g., via FFT followed by low or high pass filtering) to detect object structures based on randomness. Other features may be extracted for comparison including but not limited to reflectivity, absorbance, and/or the like.

In some examples, the object detector 1256 may be configured to employ the camera 1254 to gather image data for comparison to other, known images. In such an example, the processing circuitry 1110 (or the object detector's own processing circuitry) may be configured to employ machine learning to consider a set of n samples of data and then try to predict properties of unknown data. In practice, the object detector 1256 may utilize a plurality of images of objects in an image library to sort the images as various objects to define a "vocabulary". Test images may then be compared against the vocabulary to identify whether the test images likely include a particular object. As such, for example, in some cases feature extraction may be employed to create a vocabulary of features using "K nearest neighbor". Classifiers may then be trained on a training set to check features in an image for their closes clusters in the vocabulary. A histogram of responses may then be created for each image relative to words in the vocabulary. A sample-label dataset may then be created for the training. The classifier can then provide a classification for a test image.

As mentioned above, the sensor network 1090 may also include a 2.5D sensor 1258. The 2.5D sensor 1258 may be configured to gather data by active transmission of RF, light, or sound energy and then measuring reflected energy received. In some cases, time of flight measurements may be made to determine range (and bearing or angle) to the objects around the 2.5D sensor 1258. The sensor may be referred to as 2.5D since, unlike 3D, the 2.5D sensor 1258 does not obtain a full 3D picture. Instead, the 2.5D sensor 1258 only obtains a slice of data at a specific height (e.g., a 2D scan of range) at the approximate height of the sensor (or at least at the height at which the sensor transmits energy). Additionally, for a true 3D scan, two sensors would be required to get the front perspective and back perspective view of objects. Also, the 3D scan would have a continuous picture developed along the height dimension, whereas the 2.5D scan has limited view of the height dimension. The perspective problem can be at least partially mooted by virtue of the fact that if the 2.5D sensor 1258 is mounted on a mobile platform (which the robotic mower 1010 would clearly be), then multiple perspectives can be obtained.

In some embodiments, the 2.5D sensor 1258 may be embodied as a LIDAR (laser imaging detection and ranging) device or a LEDDAR (light emitting diode detection and ranging) device. LEDDAR devices may be useful in some cases, since LEDDAR devices handle lighting changes fairly well, and outdoor environments often encounter vastly different lighting conditions based on the weather.

In an example embodiment, the positioning module 1060 may be configured to incorporate input from a plurality of sources (e.g., among sensor network 1090 components that can generate an estimated position or cooperate to generate an estimated position) to generate a composite position based on the position information received from each of the various sources available. Thus, for example, each sensor (or at least multiple sensors) may provide separate information that can be used by the positioning module 1060 to determine a corresponding position estimate. Each position estimate may also have a weight associated therewith based on time, accuracy estimates or other factors. The positioning module 1060 may then calculate the composite position based on a weighted average of the individual position estimates from each respective source that has an input to provide. In some cases, predicted positions may further be determined based on current inputs, system model information and previous state information.

In some example embodiments, rather than (or in addition to) estimating a composite position, the positioning module 1060 may be configured to rank or order position estimates based on a confidence score associated with each position input provided from the various sources available. The position estimate with the highest confidence score may then be selected as the current estimated position. Additionally or alternatively, the positioning module 1060 may be configured to use one or more of the available sensors as a primary sensor for determining position. The positioning module 1060 may also be configured to "reset" or update the primary sensor as appropriate if a more accurate position source becomes available (e.g., as in the example of resetting the IMU 1250 when a more accurate position source is available).

In an example embodiment, the detection module 1070 may be configured to employ sensors of the sensor network 1090, the camera 1254, and/or other information to detect objects and/or boundary features. Boundary detection may be accomplished by virtue of receiving a set of boundary coordinates or boundary positions and cooperating with the positioning module 1060 to determine when the boundary coordinates or boundary positions have been reached. In other cases, boundaries may be established by having the robotic mower 1010 trace out the boundaries and record its position while tracing the boundaries. After tracing the boundaries and recording the positions, the positions may be stored as the set of boundary coordinates or boundary positions. In other cases, a temporary boundary may be placed (e.g., via a wire or other temporary boundary), and the robotic mower 1010 may operate and detect the temporary boundary coordinates or positions and store such information as the set of boundary coordinates or boundary positions. In still other example embodiments, the robotic mower 1010 may be provided with a map of the parcel 1020 and the map may be correlated to coordinates or positions that are detectable by the robotic mower 1010. Boundaries may be identified on the map and converted into the set of boundary coordinates or boundary positions that can be used to bound the operation of the robotic mower 1010.

Object detection may occur relative to static objects that may be fixed/permanent and non-moving, but also not fixed or permanent objects. Such objects may be known (if they have been encountered before at the same position) or unknown (if the present interaction is the first interaction with the object or a first interaction with an object at the corresponding location). Object detection may also occur relative to dynamic objects that may be moving. In some cases, the dynamic objects may also be either known or unknown.

In an example embodiment, the robotic mower 1010 may be configured to insert an offset or otherwise steer away from objects (and/or boundaries) to avoid collision with such objects. In some cases, the robotic mower 1010 may be configured to come back to the location of an object at a later time to see if the object has moved if it is not a known fixed object. The object can therefore be learned to be a fixed object, or the object may have moved and the robotic mower 1010 can then conduct its mowing operations where the object had been located. In any case, the detection module 1070 may employ sensors of the sensor network 1090 to ensure that the robotic mower 1010 can identify and stay within boundaries. The detection module 1070 may employ sensors of the sensor network 1090 to also identify and/or avoid contact with objects on the parcel 1020.

In an example embodiment, the classification module 1080 may be configured to classify objects encountered by the robotic mower 1010 as it traverses the parcel 1020. Classifications of known and unknown objects may be accomplished using the classification module 1080 based on machine learning relative to known images. For example, the classification module 1080, processing circuitry 1110, or object classifier 1350 may store images of previously encountered objects or other objects that are to be learned as known objects (e.g., grass, gravel, pavement, trees, flowers, etc.). When an object is encountered during operation of the robotic mower 1010, if the camera 1254 is able to obtain a new image of the object, the new image can be compared to the stored images to see if a match can be located. If a match is located, the new image may be classified as a known object. In some cases, a label indicating the identity of the object may be added to the image library in association with any object that is known.

Embodiments of the present invention may therefore be practiced using an apparatus such as the one depicted in FIGS. 10-13, in connection with the system of FIG. 9. However, it should also be appreciated that some embodiments may be practiced in connection with a computer program product for performing embodiments or aspects of the present invention. As such, for example, each block or step of the flowcharts of FIGS. 14-15, and combinations of blocks in the flowchart, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory 1114, 1314 and/or 1364) and executed by processing circuitry (e.g., processor 1112, 1312 and/or 1362).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s). In this regard, a method according to example embodiments of the invention may include any or all of the operations shown in FIGS. 14-15. Moreover, other methods derived from the descriptions provided herein may also be performed responsive to execution of steps associated with such methods by a computer programmed to be transformed into a machine specifically configured to perform such methods.

In an example embodiment, a method for collecting and classifying image data according to FIG. 14 may include maintaining an image library comprising images of known objects at operation 1700, receiving an image of a new object captured by a robotic vehicle traversing a parcel at operation 1710, comparing the image of the new object with images of known objects from the image library at operation 1720, and classifying the new object as one of the known objects at operation 1730. The method may additionally include an optional step of updating the image library based on supplemental image data received from the robotic vehicle or an external device at operation 1740.

FIG. 15 illustrates a control flow diagram of one example of how the robotic mower 1010 can be operated to classify objects outside of a boundary 1030 of a parcel 1020 in accordance with an example embodiment. As shown in FIG. 15, operation may begin with maintaining an image library comprising images of known objects at operation 1800. Operation may continue with receiving an image of a new object captured by a robotic vehicle traversing a parcel at operation 1810. The operation may continue at operation 1820 by making a decision as to whether the image of the new object matches an image of a known object from the image library. In this regard, if the decision is made that the image of the new object does match an image of a known object from the image library, then the new object will be classified as a known object at operation 1830*a*. However, if the decision is made that the image of the new object does not match an image of a known object from the image library, then the internet will be searched for an image that matches the image of the new object at operation 1830*b*. The operation may continue at operation 1840 by making a decision as to whether the image of the new object matches an image identified in the internet search. In this regard, if the decision is made that the image of the new object matches an image identified in the internet search, the image library will be updated based on the supplemental image data received from the internet at operation 1850*a*. However, if the decision is made that the image of the new object does not match an image identified in the internet search, the operator will be contacted and requested to classify the new object at operation 1850*b*.

As such, in some cases, the robotic mower 1010 may generally operate in accordance with a control method that combines the modules described above to provide a functionally robust robotic vehicle. In this regard, a method according to example embodiments of the invention may include any or all of the operations shown in FIG. 15. Moreover, other methods derived from the descriptions provided herein may also be performed responsive to execution of steps associated with such methods by a computer programmed to be transformed into a machine specifically configured to perform such methods.

In an example embodiment, an apparatus for performing the methods of FIGS. 14-15 above may comprise processing circuitry (e.g., processing circuitry 1360) that may include a processor (e.g., an instance of the processor 1362 at the server 1120) configured to perform some or each of the operations (1700-1740, 1800-1850*b*) described above. The processing circuitry 360 may, for example, be configured to perform the operations (1700-1740, 1800-1850*b*) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (1700-1740, 1800-1850*b*) may comprise, for example, the processing circuitry 1360.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   receiving image data and corresponding position data captured by a robotic vehicle traversing a parcel;
   comparing the image data with parameters known to identify grass; and
   classifying the image data as grass when the image data meets the structural parameters indicative of grass,
   wherein comparing the image data with structural parameters indicative of grass comprises:
   transforming the image data from the spatial domain to the frequency domain;
   performing low pass or high pass filtering on the image data; and
   transforming the image data back into the spatial domain.

2. The method of claim 1, wherein comparing the image data with structural parameters indicative of grass comprises:

measuring at least one of vertical or horizontal edges in the image data;
filtering out the edges that are shorter than a predetermined length known to identify grass; and
identifying the edges that are longer than a predetermined length known to identify grass as not belonging to grass.

3. The method of claim 1, wherein comparing the image data with structural parameters indicative of grass comprises:
extracting edge features extending in a first direction;
extracting edge features extending in a second direction orthogonal to the first direction;
determining distances between edges in each of the first direction and the second direction; and
making a decision as to grass structure detection.

4. The method of claim 3, wherein the first direction is horizontal and the second direction is vertical.

5. The method of claim 1, wherein the robotic vehicle comprises:
a sensor network comprising one or more sensors configured to detect conditions proximate to the robotic vehicle; and
a detection module configured to detect objects proximate to the robotic vehicle using contact-less detection.

6. The method of claim 5, wherein the sensor network comprises at least one of an inertial measurement unit (IMU), a real time kinematic (RTK)—GPS receiver, a grass detector, or a 2.5D sensor.

7. The method of claim 6, wherein the detection module is configured to receive grass detection information from at least one of the grass detector or 2.5D sensor.

8. The method of claim 5, wherein the sensor network further comprises a camera.

9. The method of claim 8, wherein the camera provides images of objects to the detection module to compare the images with parameters known to identify grass.

10. The method of claim 5, wherein the robotic vehicle further comprises:
a mapping module configured to generate a map regarding a parcel on which the robotic vehicle operates;
a positioning module configured to determine robotic vehicle position; and
one or more functional components configured to execute a lawn care function.

11. The method of claim 1, further comprising:
generating the map of the parcel based on data received; and
enabling an operator to interact with the map to view one or more content items associated with respective positions.

12. The method of claim 11, wherein generating the map of the parcel comprises incorporating input from multiple sensors of the sensor network to determine current position of the robotic vehicle and grass detection information at the current position of the robotic vehicle.

13. The method of claim 11, wherein the map comprises zones of the parcel in which each of the zones is defined by a corresponding geographic description and corresponding grass detection information.

14. A robotic vehicle, comprising:
a sensor network comprising one or more sensors configured to detect conditions proximate to the robotic vehicle;
a detection module configured to detect objects proximate to the robotic vehicle using contact-less detection, and
processing circuitry configured for:
receiving image data and corresponding position data captured by a robotic vehicle traversing a parcel;
comparing the image data with parameters known to identify grass; and
classifying the image data as grass when the image data meets the parameters known to identify grass,
wherein comparing the image data with parameters known to identify grass comprises:
transforming the image data from the spatial domain to the frequency domain;
performing low pass or high pass filtering on the image data; and
transforming the image data back into the spatial domain.

15. The robotic vehicle of claim 14, wherein comparing the image data with parameters known to identify grass comprises:
measuring at least one of vertical or horizontal edges in the image data;
filtering out the edges that are shorter than a predetermined length known to identify grass; and
identifying the edges that are longer than a predetermined length known to identify grass as not belonging to grass.

16. The robotic vehicle of claim 15, wherein comparing the image data with structural parameters indicative of grass comprises:
extracting edge features extending in a first direction;
extracting edge features extending in a second direction orthogonal to the first direction;
determining distances between edges in each of the first direction and the second direction; and
making a decision as to grass structure detection.

17. The robotic vehicle of claim 16, wherein the first direction is horizontal and the second direction is vertical.

18. The robotic vehicle of claim 14, wherein the sensor network comprises at least one of an inertial measurement unit (IMU), a real time kinematic (RTK)—GPS receiver, a grass detector, or a 2.5D sensor.

19. The robotic vehicle of claim 18, wherein the detection module is configured to receive grass detection information from at least one of the grass detector or 2.5D sensor.

20. The robotic vehicle of claim 18, wherein the sensor network further comprises a camera.

* * * * *

UNITED STATES PATENT AND TRADEMARK OFFICE
CERTIFICATE OF CORRECTION

PATENT NO. : 10,310,510 B2
APPLICATION NO. : 15/538002
DATED : June 4, 2019
INVENTOR(S) : Björn Mannefred et al.

It is certified that error appears in the above-identified patent and that said Letters Patent is hereby corrected as shown below:

In the Claims

In Column 36, Line 14, in Claim 14, "captured by a robotic vehicle traversing a parcel;" should read --captured by the robotic vehicle traversing a parcel;--.

Signed and Sealed this
First Day of October, 2019

Andrei Iancu
*Director of the United States Patent and Trademark Office*